(12) United States Patent
Fantone et al.

(10) Patent No.: US 6,791,696 B1
(45) Date of Patent: Sep. 14, 2004

(54) AUTOMATED OPTICAL MEASUREMENT APPARATUS AND METHOD

(75) Inventors: Stephen D. Fantone, Lynnfield, MA (US); Stephen R. Wilk, Saugus, MA (US); Jian Zhang, Cambridge, MA (US); Daniel J. Braunstein, Arlington, MA (US)

(73) Assignee: Optikos Corporation, Cambridge, MA (US)

( * ) Notice: Subject to any disclaimer, the term of this patent is extended or adjusted under 35 U.S.C. 154(b) by 0 days.

(21) Appl. No.: 09/328,972

(22) Filed: Jun. 9, 1999

Related U.S. Application Data
(60) Provisional application No. 60/089,771, filed on Jun. 18, 1998, and provisional application No. 60/129,814, filed on Apr. 16, 1999.

(51) Int. Cl.[7] .............................................. G01B 11/24
(52) U.S. Cl. ..................................................... 356/601
(58) Field of Search ................................ 356/630, 601, 356/600, 124, 121, 511–513; 250/559.19, 559.22, 559.27, 201.9

(56) References Cited

U.S. PATENT DOCUMENTS

| | | | | |
|---|---|---|---|---|
| 3,982,835 A | * | 9/1976 | Schwomma | ................ 356/458 |
| 4,141,652 A | | 2/1979 | Feinleib | |
| 4,399,356 A | | 8/1983 | Feinleib et al. | |
| 4,490,039 A | | 12/1984 | Bruckler et al. | |
| 4,725,138 A | | 2/1988 | Wirth et al. | |
| 4,737,621 A | | 4/1988 | Gonsiorowski et al. | |
| 4,743,117 A | * | 5/1988 | Kitabayashi et al. | ......... 356/520 |
| 5,004,346 A | * | 4/1991 | Kuhel | .......................... 356/513 |
| 5,062,702 A | * | 11/1991 | Bille | ............................ 351/212 |
| 5,305,374 A | * | 4/1994 | Smith | ............................ 606/5 |
| 5,416,586 A | * | 5/1995 | Tronolone et al. | ........... 356/513 |
| 5,581,347 A | | 12/1996 | Le Saux et al. | |
| 5,625,454 A | * | 4/1997 | Huang et al. | ................ 356/513 |
| 5,629,765 A | | 5/1997 | Schmutz | |
| 5,633,487 A | | 5/1997 | Schmutz et al. | |
| 5,708,279 A | | 1/1998 | Cheng | |
| 5,825,476 A | | 10/1998 | Abitol et al. | |
| 5,920,373 A | * | 7/1999 | Bille | ........................... 351/212 |
| 5,936,720 A | | 8/1999 | Neal et al. | |
| 6,052,180 A | | 4/2000 | Neal et al. | |

OTHER PUBLICATIONS

Liang, Junzhong; Grimm, Bernhard; Gowlz, Stefan; and Bille, Josef F., "Objective measurement of wave aberrations of the human eye with the use of a Hartmann–Shack wave–front sensor", Optical Society of America, pp. 1949–1957, 1994.

Platt, Ben, Shack, Roland V., Lenticular Hartmann Screen, Optical Science Center, Newsletter, University of Arizona, 5(1) 15–16(1971).

* cited by examiner

*Primary Examiner*—Zandra V. Smith
(74) *Attorney, Agent, or Firm*—Francis J. Caufield

(57) ABSTRACT

An automated apparatus and method for measuring properties of optical components based on wavefront sensing and analysis. A wavefront of predetermined profile is directed at a surface to be measured so that it is more or less distorted in accordance with the shape of the surface and the distorted wavefront is sensed and analyzed. From the information derived from the distorted wavefront and other knowledge of the relationship between the surface and position of the wavefront of predetermined profile, the shape of the surface may be inferred along with other properties such as radius of curvature, focal length, conic constants, asphericity, toricity, tilt, and decentering. Concave, convex, cylindrical, and flat parts may be measured along with wavefront errors in bandpass transmitting components such as lenses, filters, and windows.

26 Claims, 22 Drawing Sheets

MAPPING AT DEFOCUS 0 MICRONS
PEAK TO VALLEY VALUE: 0.611 MICRONS
RMS VALUE: 0.133521 MICRONS

MAPPING AT DEFOCUS 100 MICRONS
PEAK TO VALLEY VALUE: 0.565 MICRONS
RMS VALUE: 0..238394 MICRONS

MAPPING AT DEFOCUS 200 MICRONS
PEAK TO VALLEY VALUE: 0.722 MICRONS
RMS VALUE: 0.389452 MICRONS

MAPPING AT DEFOCUS 300 MICRONS
PEAK TO VALLEY VALUE: 0.835 MICRONS
RMS VALUE: 0.515124 MICRONS

| EXPECTED VALUE | MEASURED VALUES |
|---|---|
| MEAN RADIUS [8] mm | MEAN RADIUS [8.00623] mm<br>SPHERICAL RADIUS [7.94381] mm<br>CYLINDRICAL RADIUS [8.06864] mm<br>AXIS [85.5778] DEG |

FIG. 15

AUTOMATED OPTICAL MEASUREMENT APPARATUS AND METHOD

CROSS REFERENCE TO RELATED APPLICATION

This application claims priority from co-pending, commonly owned U.S. Provisional Patent Application No. 60/089,771 filed on Jun. 18, 1998 and 60/129,814 filed on Apr. 16, 1999.

BACKGROUND OF THE INVENTION

This invention generally relates to methods and apparatus for testing optical systems and particularly to devices and techniques for the automated measurement of a variety of parameters of optical surfaces and/or elements including radii of curvature, surface shape, thickness, power, focal length, wavefront, and aberrations.

Throughout the process for fabricating optical or components, it is frequently necessary to determine if, and how well, optical surfaces or elements conform to their designers stated requirements. Not only does the performance of optical systems in final form need to be verified, but various parameters of their components need to undergo intermediate testing for conformance with their specifications prior to final assembly as a system. Indeed, even the tools of fabrication, especially molds for the formation of plastic or glass lens elements, need to be tested for compliance with design specifications. Some of the most frequently encountered measurements that need to be made are radius of curvature of surfaces in either convex or concave form, surface topography, thickness, power, and various focal lengths.

Classically, radius of curvature is measured through the use of a hand-held instrument called a spherometer, which measures the sagittal height (sag) of the surface over a known diameter and then displays the radius of curvature on a dial or other visual display after an internal calculation that relates radius to sag height and the known diameter. However, the accuracy of such devices are prone to relatively large errors because sag heights are usually small dimensions that are difficult to accurately measure mechanically.

A more accurate technique for radii measurement involves the use of an auto-collimating microscope in an arrangement referred to as a radiusscope. Here, one first focuses on the surface to be measured and then on the center of curvature of the surface where a reticle image has been imaged back on itself by reflection from the test surface. The positions of the microscope are recorded, and the difference between them represents the radius of curvature to limits of accuracy, which depend on the preciseness of the length measurements and the ability of the operator to accurately focus.

Where the spherometer suffers from problems of precision, the use of the radiusscope, which can be accurate to microns if care is taken, is time consuming and dependent on operator skill and experience.

The thickness of an optical element is more or less important depending on its assigned role in a particular design and can be critical where the design relies heavily on its precision for aberration control or the like. Thickness obviously can be measured directly by mechanical means, which may also be automated, but there is always the danger of damaging part surfaces with mechanical approaches.

Power and focal length are always of interest and can be calculated from classical lens makers formulae having knowledge of the various numerical values required as, for example, index of refraction, radii, and thickness.

For rapid qualitative tests other approaches are also often employed. For this purpose, reliance is on the Foucault knife-edge test is often made, and while the Foucault test has its uses, it suffers from an inability to sense changes in slope deviation that are changing only slightly in magnitude or direction. For more accurate quantitative results, reliance is made on interferometric and screen methods, such as the Hartmann test, to perform wavefront analysis from which more gross properties may be derived. However, such tests, while informative, have been laborious and time consuming.

While those skilled in the art have provided a variety of ways for measuring many of the foregoing properties of optical elements and systems, there remains a need for an instrument for rapidly and accurately measuring a number of optical properties virtually simultaneously, and it is a primary object of the present invention to provide such a device.

Another object of the present invention is to provide methods and associated devices for automatically performing wavefront analysis, measuring surface topography, and determining radius of curvature, thickness, power and focal length of optical surfaces and/or elements with minimal dependence on operator skill.

Yet another object of the present invention is to provide an automated instrument for providing statistical analysis of quality in high volume production settings.

Still another object of the present invention is to satisfy all of the foregoing objects with a user-friendly device that is simple in its implementation and low in cost.

Other objects of the invention will in part be obvious and will in part appear hereinafter. A full understanding of the invention will best be had from reading the detailed description to follow in connection with the detailed drawings.

SUMMARY OF THE INVENTION

The invention comprises a system and method for automatically performing dynamic screen testing on a surface and determining its shape from which other optical parameters of interest may be derived and reported. A measuring head, consisting of a source, beamsplitter, objective lens, and lens array with a CCD camera, is mounted on a translation stage and moves along the optic axis of the head relative to the part under test. The part under test is mounted on an appropriate support, such as a three-point support nest, that automatically centers spherical parts on the optical axis of the system.

Light is projected along the optical axis through a microscope objective or other appropriate lens to illuminate the part under test with a predetermined wavefront, preferably spherical, so that subsequent calculations are made simpler if this light is recollimated parallel to the optical axis of the system. Light reflected from the part under test passes back through the lens, after which it passes through a pellicle or cube beamsplitter towards a CCD camera. A two-dimensional array, preferably in the form of a pair of crossed lenticular screens, is placed in front of the CCD active area so that a series of sharp images are formed on the CCD array. When the system measuring head is positioned so that the focal point of the objective is located near the surface of the part under test or near its center of curvature, then the incoming nearly parallel light produces a series of spots on the CCD active area. The shifts in the pattern of spots are used to determine the shape of the surface under test. Mathematical analysis of this shape provides information on the radius of curvature of the part (if spherical), the "Spherical" and "Cylindrical" radii of curvature of a toric part (along with the angle between the major axes and a given reference axis), and the "Shape Factor" of an aspheric part. For ease of interpretation, the overall shape can be expressed in various ways, including Zernike polynomials. Software performs this analysis and facilitates providing results in many useful forms—contour plots, wire-frame models of deviation, direct readout of coefficients, direct readout of RMS surface form, direct readout of peak-to-valley difference, etc. Display screens are customizable for the engineering specialist or on-the-floor auditing and measurement for production. Custom processing capabilities are available using Visual Basics® and an Object Linking And Embedding (OLE®) interface.

DESCRIPTION OF THE DRAWINGS

The structure and operation of the invention together with other objects and advantages thereof may best be understood by reading the detailed description in connection with the drawings wherein parts have been assigned a unique reference numeral that is used to identify them whenever they appear in a drawing and wherein:

FIG. 15 is an output data screen showing measured values for a toric surface;

DETAILED DESCRIPTION OF THE INVENTION

The invention comprises a system and method for automatically performing dynamic screen testing on surfaces of optical components or systems that are at least partially specularly reflecting. The inventive system may be used for rapidly and accurately measuring optical parameters of a variety of optical elements and/or surfaces including those of lenses and mold surfaces for forming them, flats, filters, and prisms. Lenses may be spherical, aspheric, or torics. The system is capable of measuring wavefronts, surface topography, radii of curvature, thickness, power and focal length, wavefront error in bandpass filters, and can exist in more or less complex forms depending on a selection of available features and desired range of operation, but in all of its forms, its principle of operation is the same.

Figure 1:
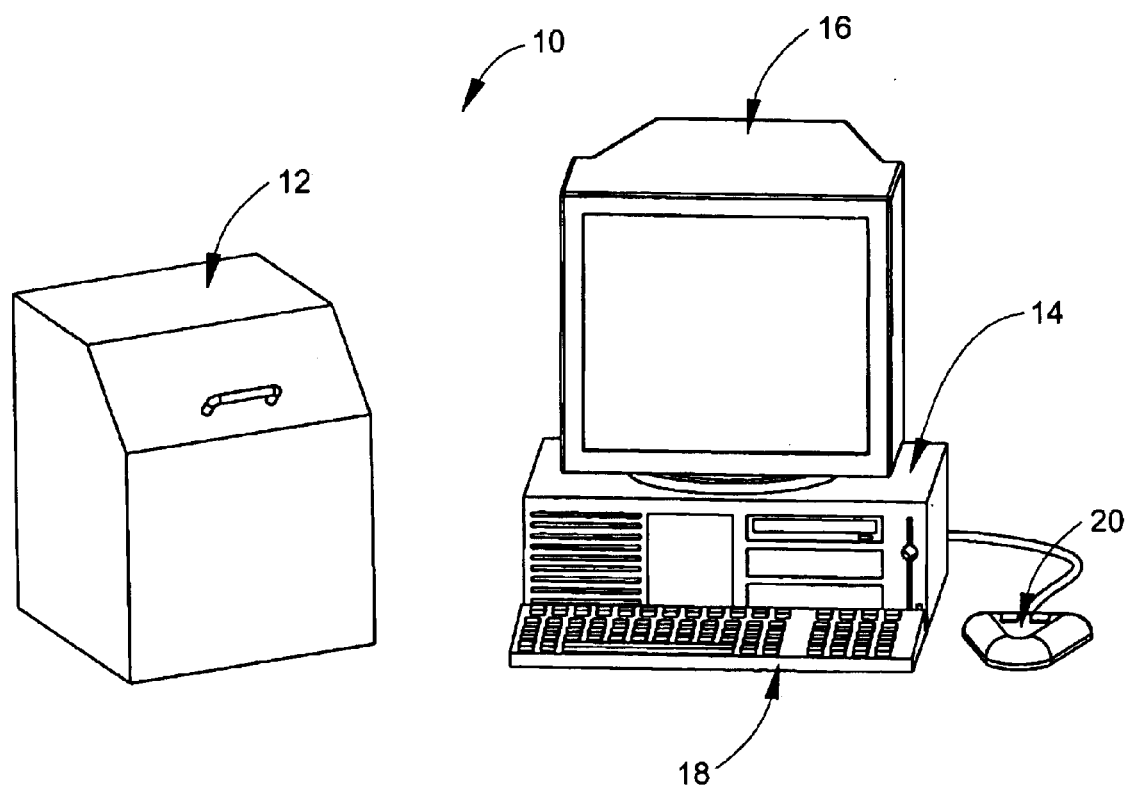
FIG. 1 is a diagrammatic perspective of the automated measuring apparatus of the invention showing an enclosed optical head in combination with a computer workstation.

Within less than a minute, for example, a measurement of radius of curvature can be made to an accuracy of less than 2.0 micrometer error, and other parametric measurements can be carried out with similar speeds. One form of the inventive system with the versatility of automatically measuring concave and convex elements over a wide parametric range and along different azimuths of rotation is shown in FIG. 1 where it is designated at 10. As can be seen in FIG. 1, along with FIGS. 2–4, automatic measuring system 10 comprises a vertically oriented optical head 12, a Pentium based computer 14, a monitor 16, preferably color, and a keyboard 18 that is preferably an enhanced type. Optical head 12 is electrically connected to computer 14 via an interface board (not shown) located in one of computer 14's expansion slots. The interface board is configured in a well-known manner as an I/O board to: provide an electronic link between computer 14 and optical head 12 for the transmission of electrical and logic signals between them; provide drive signals to stepper motors located in optical head 12; and perform certain signal processing operations on raw signals generated by a video camera in optical head 12. Miscellaneous housekeeping chores may also be implemented via the arrangement. A separate framegrabber board may also be resident in one of the expansion slots of computer 14. Suitable cables (not shown) provide electrical links.

Keyboard 18 operates in the usual way to provide the operator with a means for communicating commands to computer 14, and monitor 16 displays a variety of system responses to the operator including measurement data, system status, and menu options to be selected for system control and direction. This is preferably done via a graphical user interface (GUI) in conjunction with a mouse 20 or other suitable device.

In addition, data and computer instructions in the form of programs may be transferred between operator and computer via one or more disk drives such as those shown typically at 34 in FIG. 1.

On top of optical head 12 there is preferably provided a rotary stage 38 for receiving and supporting test optical elements in a reference plane so that they may be measured.

Figure 5:
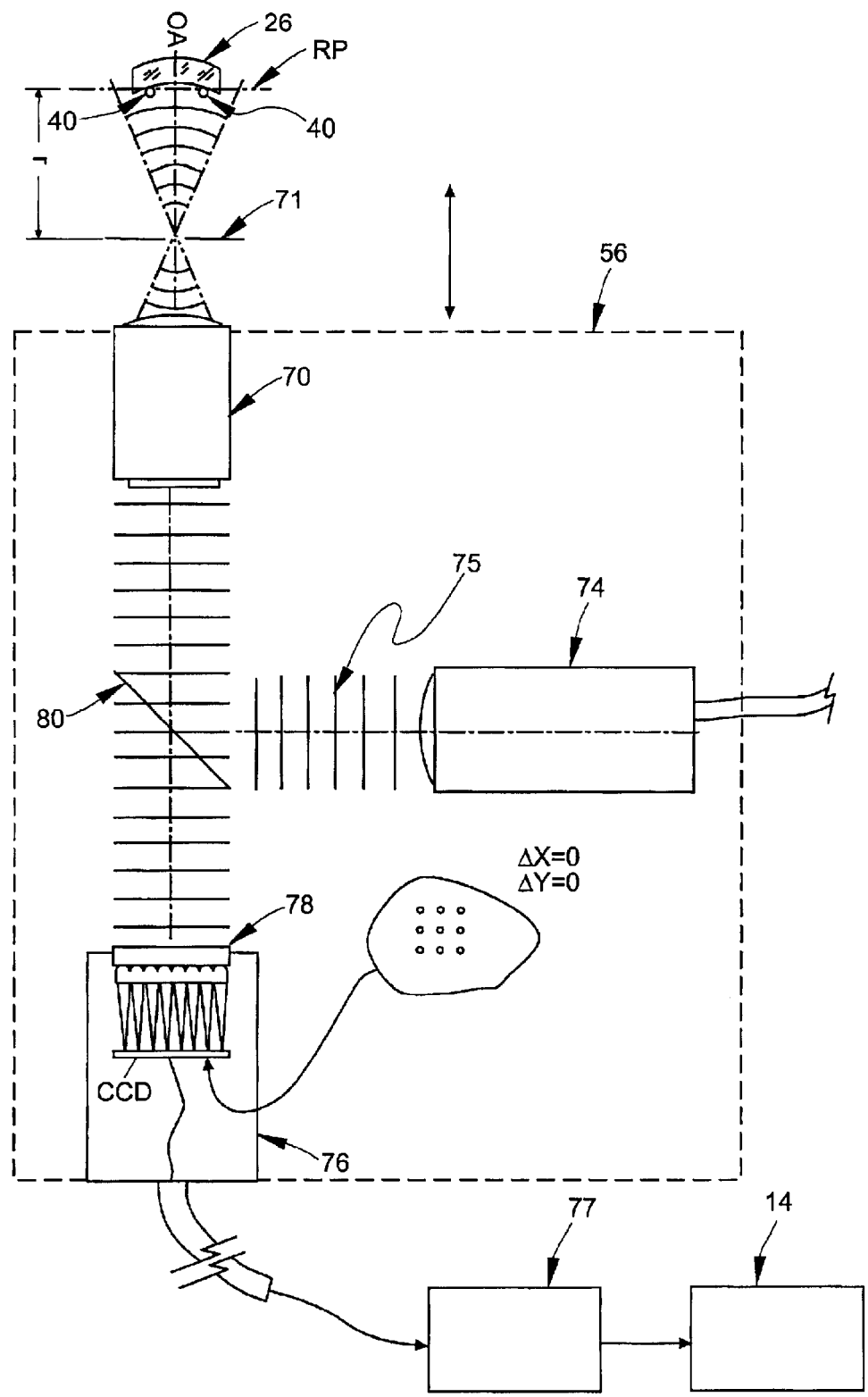
FIG. 5 is a diagrammatic elevational view of the major components of the optical head of FIG. 1 showing how a spherical test surface is illuminated with a predetermined wavefront originating at the surface's center of curvature and how that wavefront is reflected from the test surface and subsequently measured.

A fixed reference plane RP, as best seen in FIG. 5, is defined by three nylon balls 40 (only two of which are shown) that are precisely located in a V-groove formed in a nest ring 42 which also has a tapered conical tunnel that extends through to the interior of optical head 12 and is centered about its optical axis, OA, although not shown. In this connection, it is to be noted that the three nylon balls 40 also force the center of curvature of spherical surfaces to lie along the optical axis, OA, of the instrument. This is so because the various optical components comprising the optical head 12 are precisely aligned with the optical axis which, in turn, is made parallel to the mechanical axis of the optical head 12, and the mechanical axis is preferably made precisely perpendicular to the plane defined by the balls 40. If only spherical surfaces are to be measured, it is also possible to use a donut instead of the three nylon balls 40.

As can be seen in FIG. 5, test elements, such as that shown as 26, advantageously are automatically located in the reference plane by this three-ball location arrangement, even if slightly tilted about their own axis. When viewed from above, a circle centered on optical axis, OA, and drawn through the centers of each of them defines the semidiameter of the reference plane.

Figure 2:
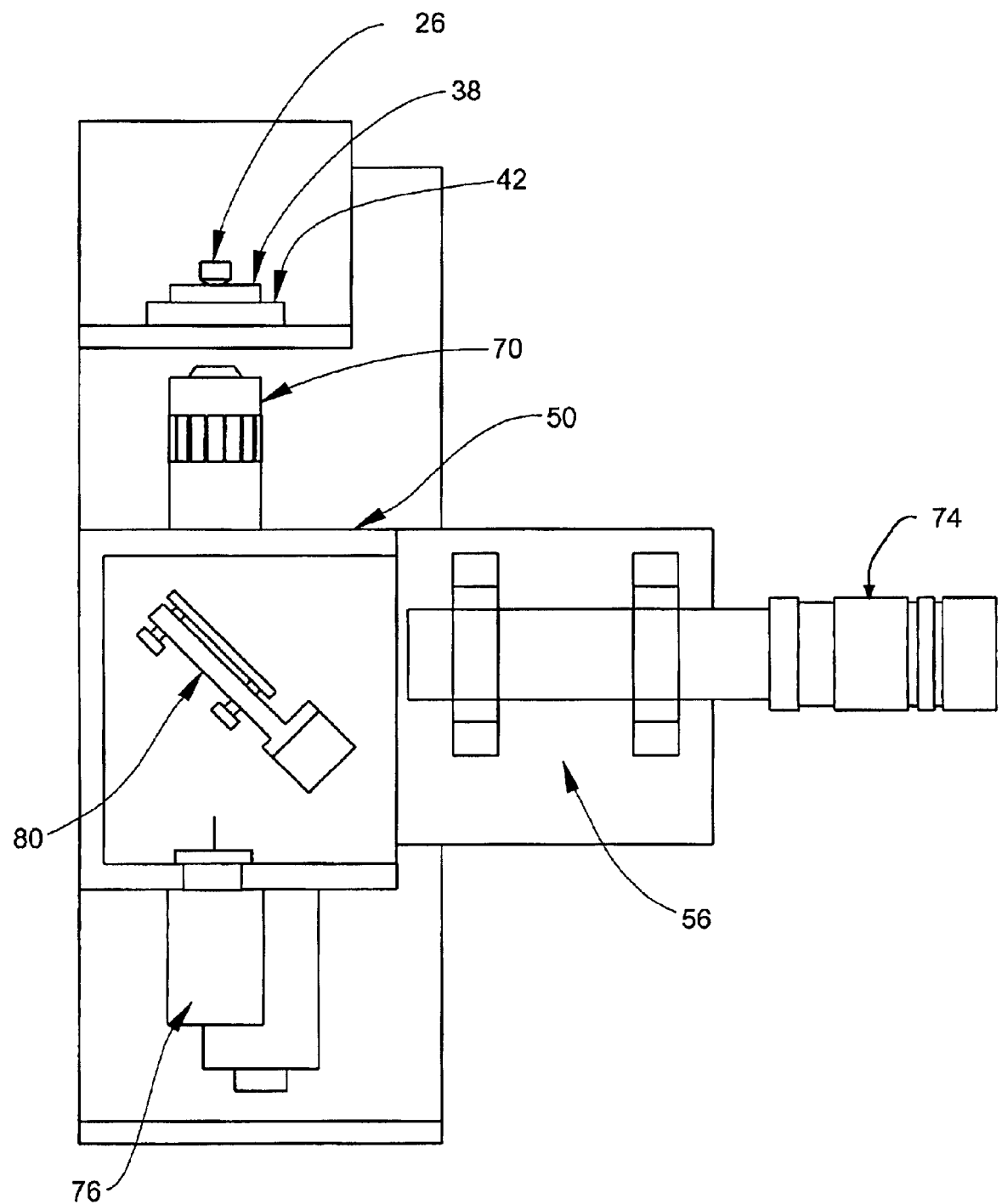
FIG. 2 is a diagrammatic front perspective view of the optical head of FIG. 1 uncovered so that its major components may be seen.
Figure 3:
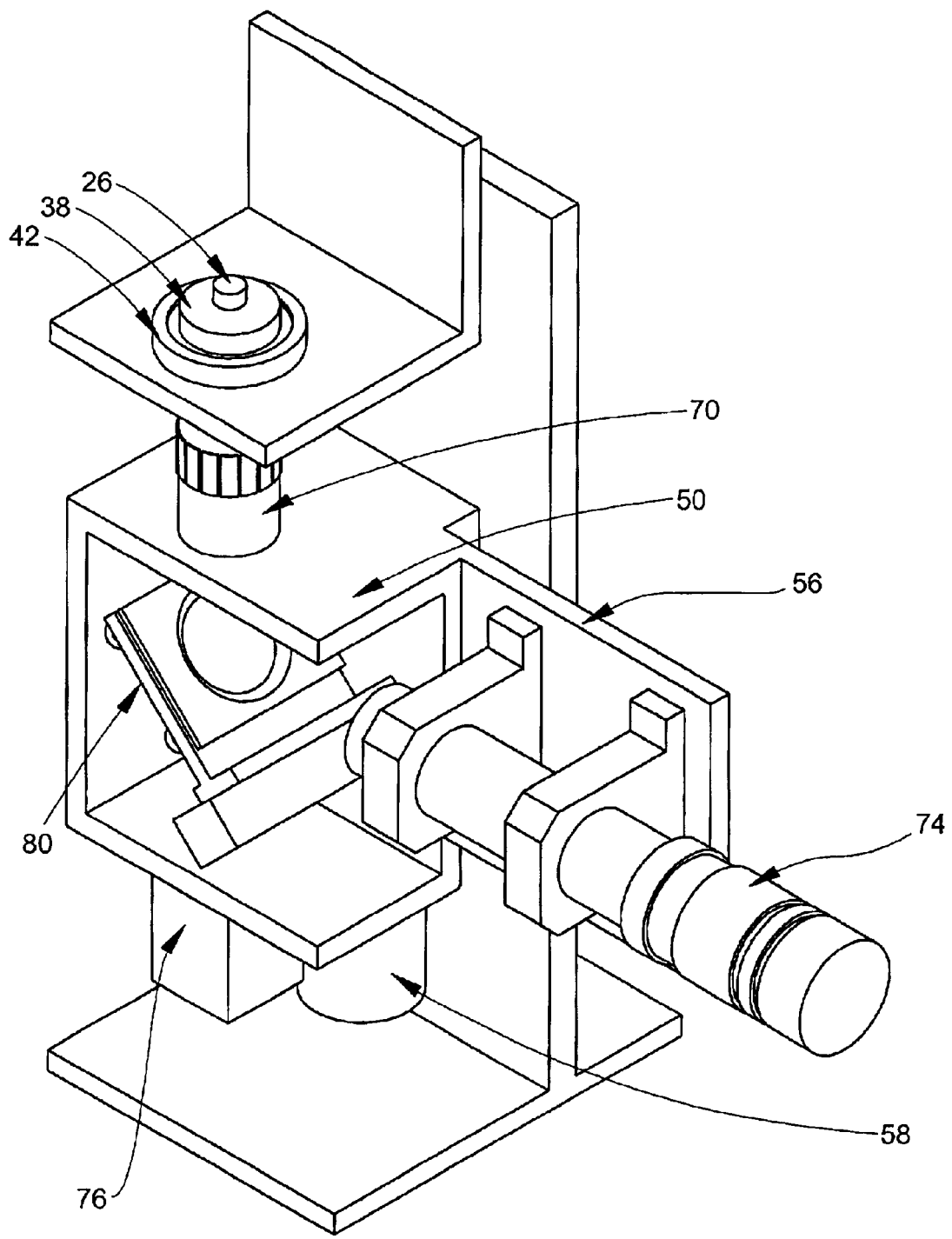
FIG. 3 is a diagrammatic, right quarter perspective view of the optical head of FIG. 1 uncovered so that its major components may be seen from a different vantage point than that of FIG. 2.
Figure 4:
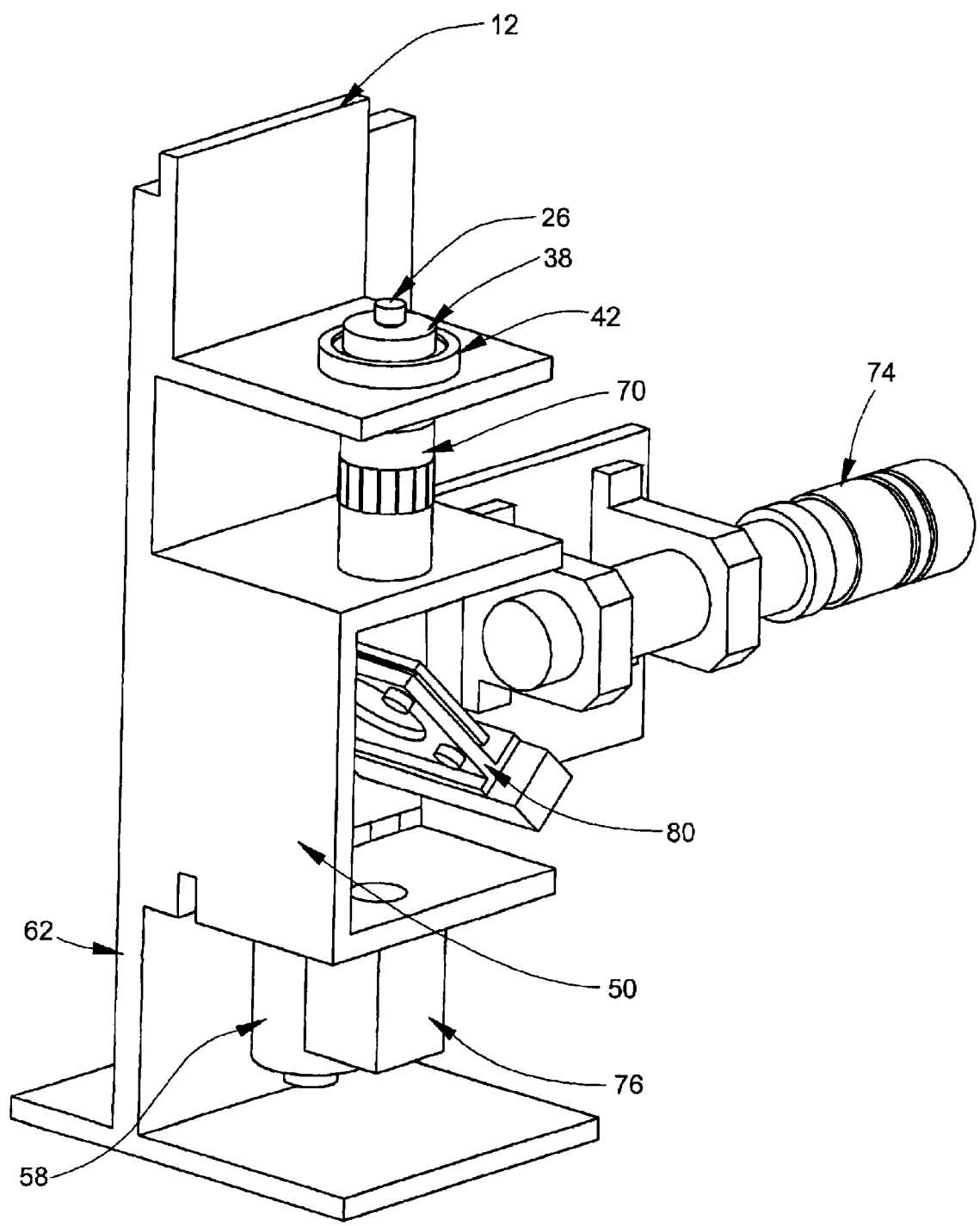
FIG. 4 is a diagrammatic, left quarter perspective view of the optical head of FIG. 1 uncovered so that its major components may be seen from a different vantage point than either that of FIG. 2 or FIG. 3.

Referring now to FIGS. 2–4, which show the interior of optical head 12, it is seen to further comprise a scanning head 50, which can be vertically moved along optical axis, OA, via a translation stage 56 that, in turn, is driven via a conventional lead screw (not shown). The precision lead screw is driven by a precision stepper motor 58 fixed to the rear wall of optical head 12 and under command of computer 14. Translation stage 56 moves parallel to optical axis, OA, on a complementary configured precision slide arrangement not shown in detail, but generally designated at 62 in FIG. 4. The pitch of the lead screw and the rotational steps of motor 58 are preferably selected in a well-known manner so that each step of the stepper motor 58 controllably moves the scanning head 50 up or down by a small fraction of a millimeter. The accuracy of this stepping motion can be enhanced by the use of encoders which directly measure translation of stage 56 at each step. In addition to improving accuracy, encoders can also be utilized in minimizing inaccuracies due to wear, especially in the precision lead screw assembly 62.

Computer 14 is programmed in a well-known manner to keep track of the position of scanning head 50. In addition, limit switches may be provided to prevent scanning head 50 from mechanically interfering with any structure beneath rotary table 38 and also to provide a locating signal indicating that scanning head 50 has reached its uppermost position when closed. In this manner, means are provided for precisely moving scanning head 50 along optical axis, OA, while at the same time providing a signal by which its vertical position can be monitored and controlled via computer 14.

Figure 9:
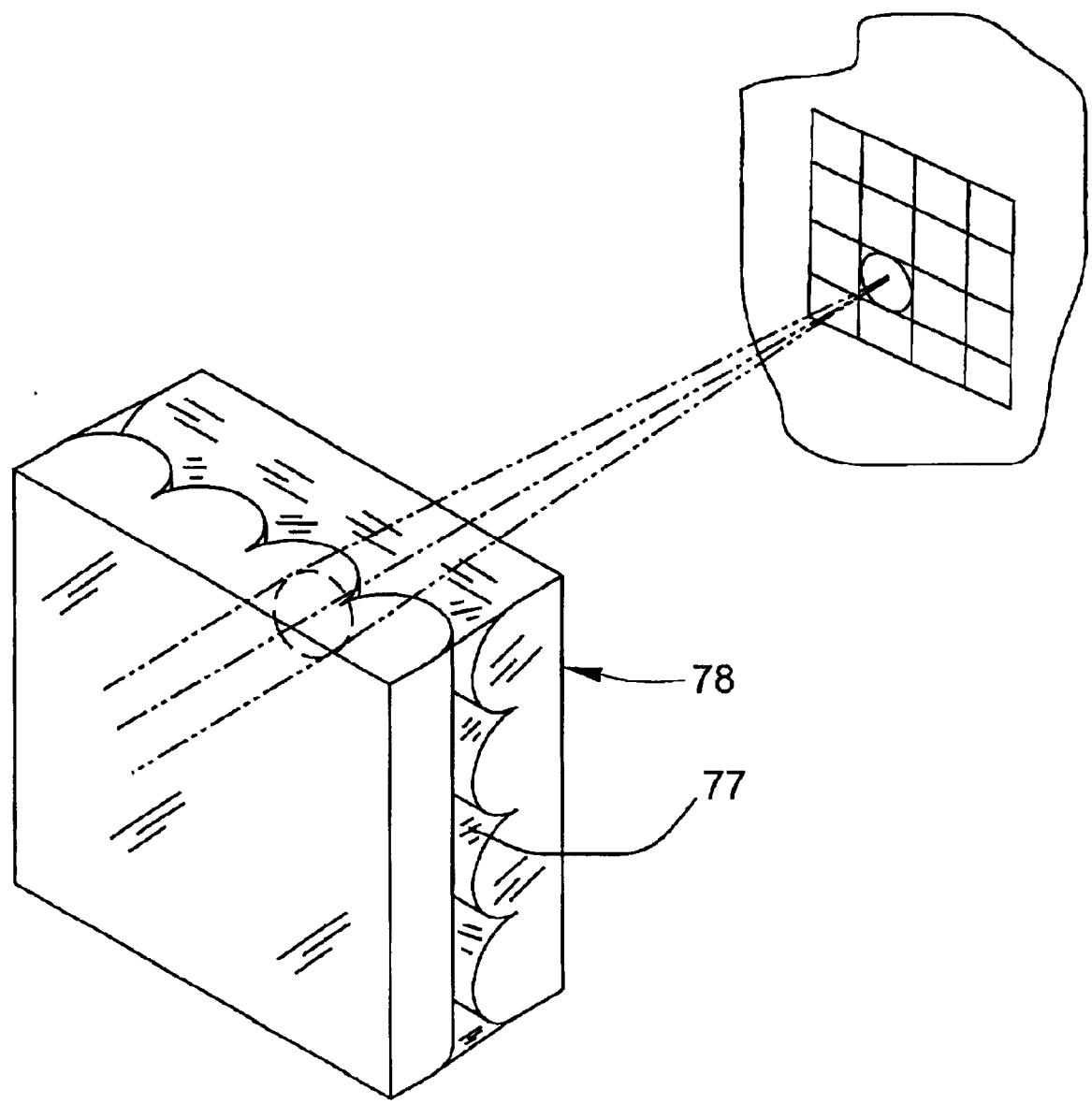
FIG. 9 is an enlarged diagrammatic perspective showing how "crossed lenticular" screens are used in the invention to provide an array of equivalent spherical lenses.

Scanning head 50 comprises a number of components all of which travel together along optical axis, OA. As best seen in FIG. 5, with occasional reference back to FIGS. 2–4, these comprise a microscope objective 70, an adjustable diaphragm 71, preferably a pin hole, a collimated source of illumination 74 preferably in the form of a light emitting diode (LED) provided with suitable collimating optics, a pellicle beamsplitter 80 located between objective 70, source 74 and a video camera 76 to provide a split optical path between the three. The objective for camera 76 is preferably a pair of crossed lenticular screens with index mismatching material 77 sandwiched between them as best seen in FIG. 9. The crossed lenticular screens operate to provide the system with an array that is equivalent to a 2D array of spherical lenses each of substantially the same focal length. The presence of the index material provides a mechanism by which the focal length of the individual equivalent spherical lenses of the screen may be varied by a factor of four or more depending on the availability of index of the material in accordance with the following relationship:

$$f = \frac{R}{n' - n}$$

where n' is the index of refraction of the lenticular screen material and n is the index of refraction of the material 77 between the crossed lenticular screens. Here, common indices range from approximately from 1.40 to 1.59.

It will be recognized that the lenticular screen may be replaced by an array of spaced apart mechanical apertures or holes but with an attendant reduction in the dynamic range of the apparatus. This is so because the spherical lenses make for more tightly focused spots thereby making the amount of change in the local slope greater before spots overlap compared with what would be the case with pure mechanical apertures. Also, use may be made of commercially available microlens arrays in place of the crossed lenticular screen and intermediate mismatching material.

Filters may also be used as needed to control the spectral output of the LED. Light source 74 preferably comprises an LED although a laser, fiber optic source, incandescent lamp, or discharge lamp may be used. Considerations in the choice of the type of source to use include efficiency, cost, lifetime, ease of adjustment of light levels, and compactness. The spectral output of the source 74 should be considered because objective lens 70, being a microscope objective, is in the best case corrected for visible wavelengths. So, the spectral content of source 74 needs to be considered in terms of its impact on signal level because of any longitudinal aberrations introduced at wavelengths outside the visible region. In addition, it is important to note that the part being measured may introduce chromatic aberrations if measured with a broader bandwidth source, and this may influence measurements in an undesirable way. Consequently, an LED is quite acceptable because it is a narrow source with no speckle or laser coherence problems. In addition, it is fairly monochromatic and easy to modulate. The bandwidth of a narrow LED source for this purpose is typically tens of nanometers wide, not hundreds, and such devices are readily commercially available at low cost. In addition, they require low power to operate and have low heat dissipation.

The magnification, aperture, and NA of objective 70 are selected in well-known manners to operate in conjunction with the other system components so that adequate signal level is available over the desired area of surface to be measured.

Figure 6:
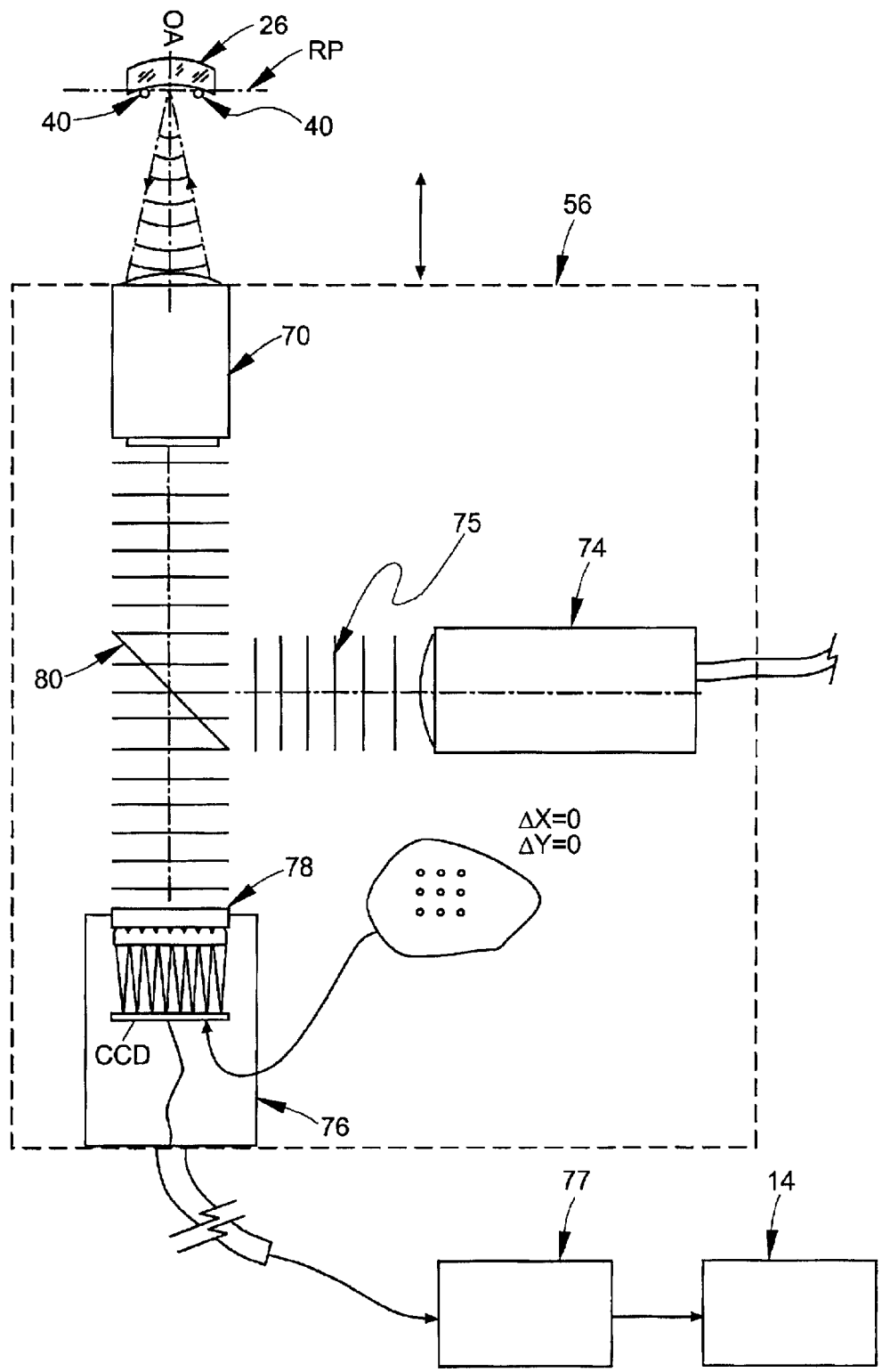
FIG. 6 is a diagrammatic elevational view of the major components of the optical head of FIG. 1 showing how a spherical test surface is illuminated with a predetermined wavefront focused on the surface and how that wavefront is reflected from the test surface and subsequently measured.
Figure 7:
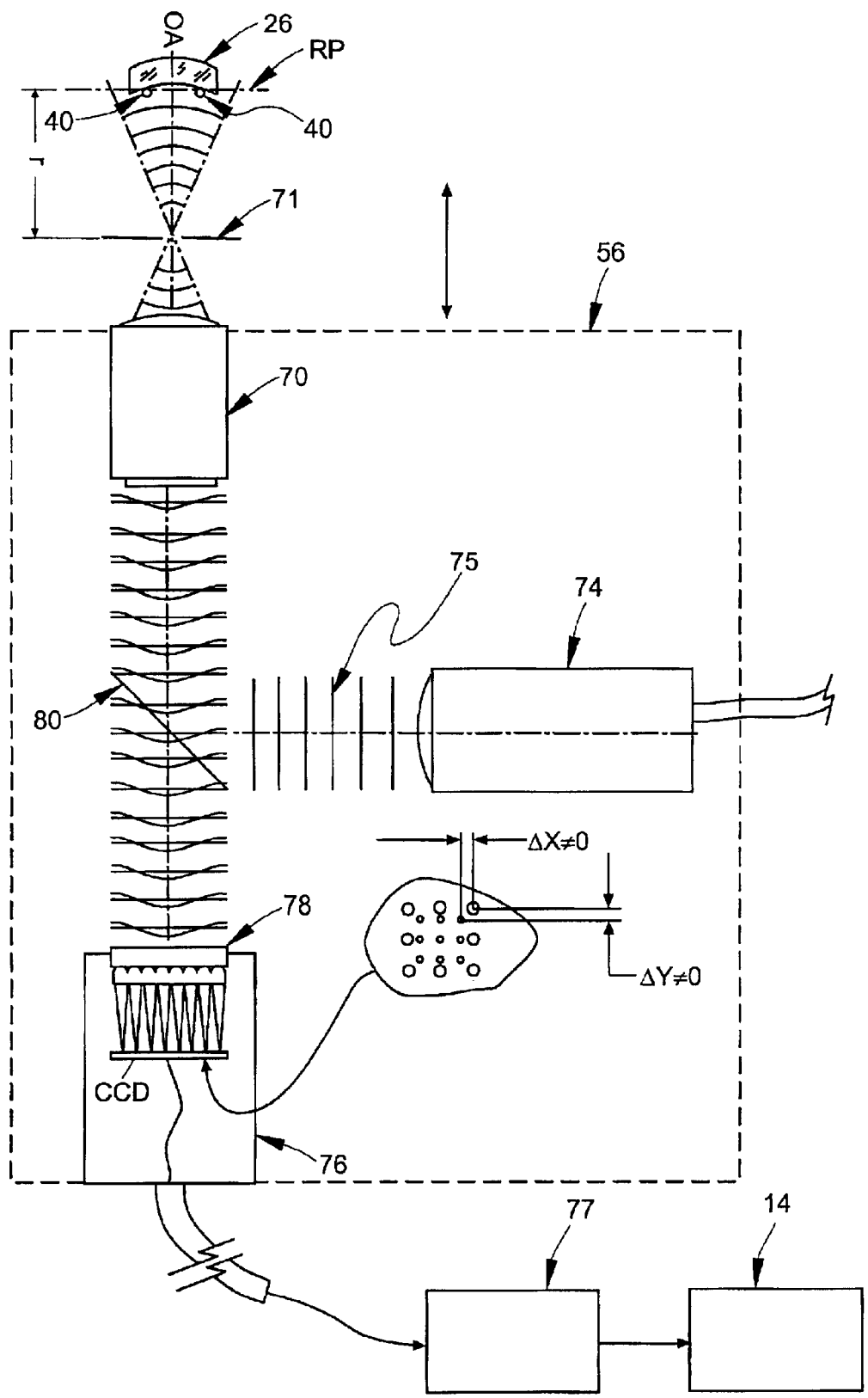
FIG. 7 is a diagrammatic elevational view of the major components of the optical head of FIG. 1 showing how a spherical test surface is illuminated with a predetermined wavefront originating at some location other than the surface's center of curvature and how that wavefront is reflected from the test surface and subsequently measured.

Having described the major system components of optical head 12, its operation will now be taken up referring to FIGS. 5–7. Optical head 12, comprising source 74, beamsplitter 80, objective lens 70, and lens array 78 with CCD camera 76, is mounted on translation stage 56 and moves along the optical axis of the head relative to the part under test. The part under test is mounted on an appropriate support, such as a three-point support nest that automatically centers spherical parts on the optical axis of the system.

Light in the form of a collimated beam with a plane wavefront 75 is projected along the optical axis via beamsplitter 80 through a microscope objective 70 or other appropriate lens to illuminate the part under test with a predetermined wavefront, preferably spherical. The spherical wavefront is preferred, although not strictly required, so that subsequent calculations to be described are made simpler if the reflected light is re-collimated parallel to the optical axis of the system. Light reflected from the part under test passes back through microscope lens 70, after which it passes through pellicle beamsplitter 80 towards array 78 of CCD camera 76. Lenticular array 78 is placed in front of the CCD active area, one focal length away from it, so that a series of sharp images are formed on the CCD array. This image or series of images as the case may be, is passed via framegrabber 77 to computer 14 for analysis.

Figure 8:
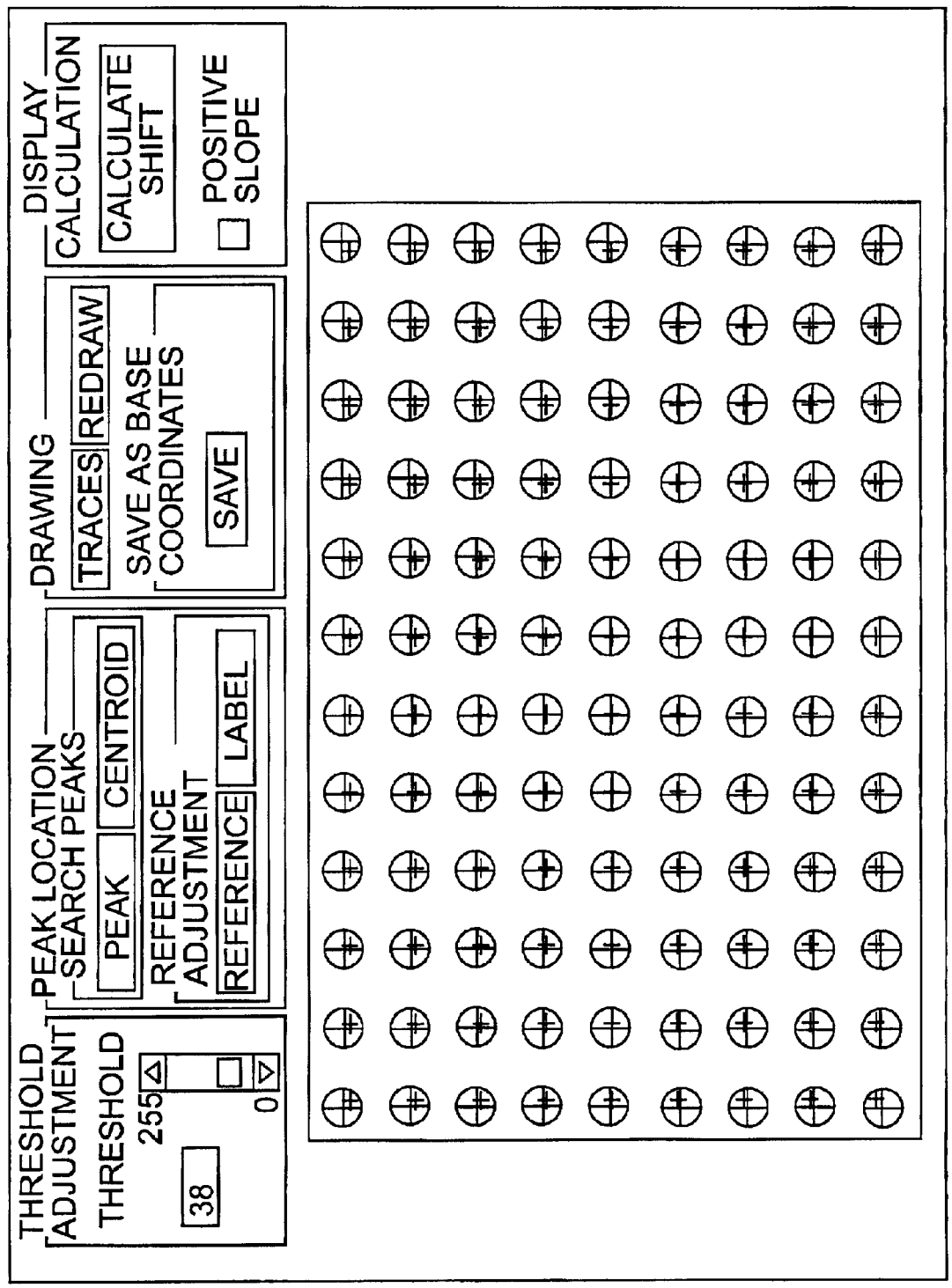
FIG. 8 is a diagrammatic illustration showing the anticipated location of an array of dots from a spherical surface illuminated with a spherical wavefront originating at the surface's center of curvature along with deviations of the dots as the origin of the wavefront passes through the surface's center of curvature (through focus)

When the system measuring head is positioned so that the focal point of the objective is located near the surface of the part under test as shown in FIG. 6, or near the center of curvature of the part under test as shown in FIG. 5, then the incoming nearly parallel light produces a series of spots on the CCD active area, $\Delta x=0$ and $\Delta y=0$, the x and y displacements measured as deviations of a spot's centroid (See FIG. 8 which shows the variation of spot locations with focus position). The shifts in the pattern of spots is used to determine the topography of the surface under test as described hereinafter.

As best seen in FIG. 7, when the origin of the spherical wavefront is at some point other than the surface or its center of curvature (assuming a spherical surface), the return wavefront is no longer a plane wavefront and the $\Delta x \neq 0$ and $\Delta y \neq 0$. As will be seen, mathematical analysis of these deviations leads to a measurement of the surface topography which, in turn, provides information on the radius of curvature of the part (if spherical), the "Spherical" and "Cylindrical" radii of curvature of a toric part (along with the angle between the major axes and a given reference axis), and the "Shape Factor" of an aspheric part, as well as other parameters which may be readily derived. For ease of interpretation, the overall shape can be expressed in various ways, including Zernike polynomials. Software performs this analysis and facilitates providing the results in many useful forms as, for example, contour plots, wire-frame models of deviation, direct readout of coefficients, direct readout of RMS surface form, direct readout of peak-to-valley difference, etc. Display screens are customizable for the engineering specialist or on-the-floor auditing and measurement for production. Custom processing capabilities are available using Visual Basic and an Object Linking And Embedding (OLE) interface.

Having described the components of the optical head and how plane and distorted wavefronts are generated in it, the mathematical algorithms used to analyze the information so generated will now be taken up. It is assumed that the part to be measured can be described, at least approximately, as having a radius of curvature r. Z-bar, the surface shape is then the sum of two components, a z component related to the radius of curvature r and the sag h(x,y), which is the departure of the surface from the base radius, r. Thus the surface may be represented by a sum of coefficients and functions, preferably as algebraic polynomials. Further, the focal length of the objective (or other lens) used to focus the collimated beam is f. The focal length of the array of lenslets is F. The separation between the array and the back principal plane of the objective is d.

Whenever the position of the optical head 12 is located so that the focus of the objective is very close to the surface of the part under test or its center of curvature, the reflected light will be very nearly collimated, and the result will be a series of well-focused spots on the CCD, with very nearly equal spacing between adjacent spots (assuming the lenslets in the array are nearly equally spaced). There will, in general, be a shift between the location of a given spot and the spot one obtains when truly collimated light is incident on the CCD camera with its lenslet array. So long as the light is nearly collimated, there is no great difficulty in associating any given deviated spot with the position of an undeviated spot. If necessary, one such spot can be decreased in intensity or otherwise identified by eccentricity in shape, intensity, or location so as to provide a reference point to help identify spot correspondence. (The appearance of a series of undeviated spots can easily be generated by placing a plane first-surface mirror atop the lens nest, or use a reflection from the unused "arm" of light reflected from the beamsplitter). The size and direction of the deviation of this spot from the expected position provides information on the angular shift of the ray of light at that point. This can be related to the difference in the part under test between the expected slope for a spherical surface and the actual slope. From this is derived the deviation in surface height between a spherical reference surface (whose radius is equal to the distance between the "Surface" location and the present position of the translation stage) and the true surface. Note that the actual surface Z-bar will always be substantially the same regardless of the location of the objective focus with respect to the surface provided sensible deviations are being measured.

The difference in height $h(x_{pij}, y_{pij})$ of the surface of the part under test is expressed as a polynomial in two variables, $x_{pij}$ and $y_{pij}$:

$$h(x_{pij}, y_{pij}) = a_{10}x_{pij} + a_{01}y_{pij} + a_{11}x_{pij}y_{pij} + a_{20}x_{pij}^2 + a_{02}y_{pij}^2 + \ldots$$

Here the subscript "p" denotes a coordinate on the surface of the part (without the "p" the coordinates x and y refer to coordinates in the CCD plane). The subscripts i and j refer to the numbering of the coordinates/spots. The angular deviation $\epsilon_{xij}$ at a spot $(x_p, y_p)$ measured along the x-direction is given by:

$$\left.\frac{\partial h}{\partial x_p}\right|_{(x_{pij}, y_{pij})} = \epsilon_{xij}$$

Similarly, the angular deviation $\epsilon_{yij}$ along the y-direction is given by:

$$\left.\frac{\partial h}{\partial y_p}\right|_{(x_{pij}, y_{pij})} = \epsilon_{yij}$$

Straightforward calculation (using, as an example, polynomials only to second order) then gives:

$$\epsilon_{xij} = a_{10} + 2a_{20}x_{pij} + a_{11}y_{pij}$$

$$\epsilon_{xij} = a_{01} + a_{11}x_{pij} + 2a_{02}y_{pij}$$

The relationship between these slopes and the observed shifts of the spots seen by the CCD can be related by the following expressions, obtained from geometrical optics. The value of the radius of curvature, r, should be set equal to the separation between the positions of the translation stage at which the spot shifts are minimized:

$$\varepsilon_{xij} = \Delta x_{ij}\frac{f}{2Fr} = a_{10} + 2a_{20}x_{pij} + a_{11}y_{pij}$$

$$\varepsilon_{yij} = \Delta y_{ij}\frac{f}{2Fr} = a_{01} + a_{11}x_{pij} + 2a_{02}y_{pij}$$

Finally, the coordinates on the surface of the (concave) part are related to those in the plane of the CCD by the expressions:

$$x_{pij} = -\left(\frac{r}{f}\right)x_{ij} + \Delta x_{ij}\left\{\left(\frac{1}{F}\right)\left[\frac{dr}{f} - (r+f)\right]\right\}$$

$$y_{pij} = -\left(\frac{r}{f}\right)y_{ij} + \Delta y_{ij}\left\{\left(\frac{1}{F}\right)\left[\frac{dr}{f} - (r+f)\right]\right\}$$

Here $\Delta x_{ij}$ and $\Delta y_{ij}$ are the shifts in the x- and y-directions of the i,jth spot. (For convex parts we replace r by −r). The index i runs from 0 to N, while the index j runs from 0 to M.

Next, the values of the coefficients of the polynomials are calculated by performing a least-square fit of the observed shifts of the spots to the shape of the surface, using the above relations. If $\epsilon_{xij} = \xi_{ij}$ and $\epsilon_{yij} = \eta_{ij}$, then this least-square fit can be accomplished by solving the matrix equation:

$$\begin{bmatrix} NM & 0 & \sum y_{pij} & 2\sum x_{pij} & 0 \\ 0 & NM & \sum x_{pij} & 0 & 2\sum y_{pij} \\ \sum y_{pij} & \sum x_{pij} & \sum (y_{pij}^2 + x_{pij}^2) & 2\sum x_{pij}y_{pij} & 2\sum x_{pij}y_{pij} \\ 2\sum x_{pij} & 0 & 2\sum x_{pij}y_{pij} & 4\sum x_{pij}^2 & 0 \\ 0 & 2\sum y_{pij} & 2\sum x_{pij}y_{pij} & 0 & 4\sum y_{pij}^2 \end{bmatrix} \begin{pmatrix} a_{10} \\ a_{01} \\ a_{11} \\ a_{20} \\ a_{02} \end{pmatrix} =$$

$$\begin{pmatrix} \sum \xi_{ij} \\ \sum \eta_{ij} \\ \sum (y_{pij}\xi_{ij} + x_{pij}\eta_{ij}) \\ 2\sum x_{pij}\xi_{ij} \\ 2\sum y_{pij}\eta_{ij} \end{pmatrix}$$

The relevant expressions for carrying the surface profile out to fourth order are longer and more daunting. The slope equations become:

$$\xi_{ij} = a_{10} + 2a_{20}x + a_{11}y + 3a_{30}x^2 + 2a_{21}xy + a_{12}y^2 + 4a_{40}x^3 + 3a_{31}x^2y + 2a_{22}xy^2 + a_{13}y^3$$

$$\eta_{ij} = a_{01} + a_{11}x + 2a_{02}y + a_{21}x^2 + 2a_{12}xy + 3a_{03}y^2 + a_{31}x^3 + 2a_{22}x^2y + 3a_{13}xy^2 + 4a_{04}y^3$$

(To save space, the subscripts on the variables have been suppressed. All x's are $x_{pij}$ and all y's are $y_{pij}$, all variables on the surface of the part.). The matrix corresponding to the second-order matrix above is a 14×14 matrix. It will not fit on this page legibly, so it is broken down by a vertical fissure into two halves, which are reproduced below, the left side first (Note that the matrix is symmetrical about the diagonal. Again, the subscripts have been suppressed for the purposes of clarity.):

$$\begin{bmatrix} NM & 0 & 2\sum x & \sum y & 0 & 3\sum x^2 & 2\sum xy \\ 0 & NM & 0 & \sum x & 2\sum y & 0 & \sum x^2 \\ 2\sum x & 0 & 4\sum x^2 & 2\sum xy & 0 & 6\sum x^3 & 4\sum x^2 y \\ \sum y & \sum x & 2\sum xy & \sum(x^2+y^2) & 2\sum xy & 3\sum x^2 y & \sum(2xy^2+x^3) \\ 0 & 2\sum y & 0 & 2\sum xy & 4\sum y^2 & 0 & 2\sum x^2 y \\ 3\sum x^2 & 0 & 6\sum x^3 & 3\sum x^2 y & 0 & 9\sum x^4 & 6\sum x^3 y \\ 2\sum xy & \sum x^2 & 4\sum x^2 y & \sum(2xy^2+x^3) & 2\sum x^2 y & 6\sum x^3 y & \sum(4x^2 y^2 + x^4) \\ \sum y^2 & 2\sum xy & 2\sum xy^2 & \sum(2x^2 y + y^3) & 4\sum xy^2 & 3\sum x^2 y^2 & 2\sum(xy^3 + x^3 y) \\ 0 & 3\sum y^2 & 0 & 3\sum xy^2 & 6\sum y^3 & 0 & 3\sum x^2 y^2 \\ 4\sum x^3 & 0 & 8\sum x^4 & 4\sum x^3 y & 0 & 12\sum x^5 & 8\sum x^4 y \\ 3\sum x^2 y & \sum x^3 & 6\sum x^3 y & \sum(3x^2 y^2 + x^4) & 2\sum x^3 y & 9\sum x^4 y & \sum(6x^3 y^2 + x^5) \\ 2\sum xy^2 & 2\sum x^2 y & 4\sum x^2 y^2 & 2\sum(xy^3 + x^3 y) & 4\sum x^2 y^2 & 6\sum x^3 y^2 & \sum(4x^2 y^3 2x^4 y) \\ \sum y^3 & 3\sum xy^2 & 2\sum xy^3 & \sum(3x^2 y^2 + y^4) & 6\sum xy^3 & 3\sum x^2 y^3 & \sum(2xy^4 + 3x^3 y^2) \\ 0 & 4\sum y^3 & 0 & 4\sum xy^3 & 8\sum y^4 & 0 & 4\sum x^2 y^3 \end{bmatrix}$$

The right half of the matrix is:

$$\begin{bmatrix} \sum y^2 & 0 & 4\sum x^3 & 3\sum x^2 y & 2\sum xy^2 & \sum y^3 & 0 \\ 2\sum xy & 3\sum y^2 & 0 & \sum x^3 & 2\sum x^2 y & 3\sum xy^2 & 4\sum y^3 \\ 2\sum xy^2 & 0 & 8\sum x^4 & 6\sum x^3 y & 4\sum x^2 y^2 & 2\sum xy^3 & 0 \\ \sum(2x^2 y + y^3) & 3\sum xy^2 & 4\sum x^3 y & \sum(3x^2 y^2 + x^4) & 2\sum(xy^3 + x^3 y) & \sum(y^4 + 3x^2 y^2) & 4\sum xy^3 \\ 4\sum xy^2 & 6\sum y^3 & 0 & 2\sum x^3 y & 4\sum x^2 y^2 & 6\sum xy^3 & 8\sum y^4 \\ 3\sum x^2 y^2 & 0 & 12\sum x^5 & 9\sum x^4 y & 6\sum x^3 y^2 & 3\sum x^2 y^3 & 0 \\ 2\sum(xy^3 + x^3 y) & 3\sum x^2 y^2 & 8\sum x^4 y & \sum(6x^3 y^2 + x^5) & \sum(4x^2 y^3 + 2x^4 y) & \sum(2xy^4 + 3x^2 y^2) & 4\sum x^2 y^3 \\ \sum(4x^2 y^2 + y^4) & 6\sum xy^3 & 4\sum x^3 y^2 & \sum(3x^2 y^3 + 2x^4 y) & \sum(2xy^4 + 4x^3 y^2) & \sum(y^5 + 6x^2 y^3) & 8\sum xy^4 \\ 6\sum xy^3 & 9\sum y^4 & 0 & 3\sum x^3 y^2 & 6\sum x^2 y^3 & 9\sum xy^4 & 12\sum y^5 \\ 4\sum x^3 y^2 & 0 & 16\sum x^6 & 12\sum x^5 y & 8\sum x^4 y^2 & 4\sum x^3 y^3 & 0 \\ \sum(3x^2 y^3 + 2x^4 y) & 3\sum x^3 y^2 & 12\sum x^5 y & \sum(9x^4 y^2 + x^6) & \sum(6x^3 y^3 + 2x^5 y) & 3\sum(x^2 y^4 + x^4 y^2) & 4\sum x^3 y^3 \\ \sum(2xy^4 + 4x^3 y^2) & 6\sum x^2 y^3 & 8\sum x^4 y^2 & \sum(6x^3 y^3 + 2x^5 y) & 4\sum(x^2 y^4 + x^4 y^2) & \sum(2xy^5 + 6x_3 y^3) & 8\sum x^2 y^4 \\ \sum(y^5 + 6x^2 y^3) & 9\sum xy^4 & 4\sum x^3 y^3 & 3\sum(x^2 y^4 + x^4 y^2) & \sum(2xy^5 + 6x^3 y^3) & \sum(y^6 + 9x^2 y^4) & 12\sum xy^5 \\ 8\sum xy^4 & 12\sum y^5 & 0 & 4\sum x^3 y^3 & 8\sum x^2 y^4 & 12\sum xy^5 & 16\sum y^6 \end{bmatrix}$$

The accompanying "Results" column vector is a 14×1 expression:

$$\begin{bmatrix} \sum \xi_{ij} \\ \sum \eta_{ij} \\ 2\sum x_{pij}\xi_{ij} \\ \sum(y_{pij}\xi_{ij} + x_{pij}\eta_{ij}) \\ 2\sum y_{pij}\eta_{ij} \\ 3\sum x_{pij}^2\xi_{ij} \\ \sum(2x_{pij}y_{pij}\xi_{ij} + x_{pij}^2\eta_{ij}) \\ \sum(y_{pij}^2\xi_{ij} + 2x_{pij}y_{pij}\eta_{ij}) \\ 3\sum y_{pij}^2\eta_{ij} \\ 4\sum x_{pij}^3\xi_{ij} \\ \sum(3x_{pij}^2 y_{pij}\xi_{ij} + x_{pij}^3\eta_{ij}) \\ 2\sum(x_{pij}y_{pij}^2\xi_{ij} + x_{pij}^2 y_{pij}\eta_{ij}) \\ \sum(y_{pij}^3\xi_{ij} + 3x_{pij}y_{pij}^2\eta_{ij}) \\ 4\sum y_{pij}^3\eta_{ij} \end{bmatrix}$$

The calculations can be extended for surfaces of any power, but it should be noted that the number of terms grows very rapidly. For a surface expressed in powers up to the nth order there will be $(n+1)(n+2)/2$ terms, and the required matrix expression will be Q×Q, where $Q = \{(n+1)(n+2)/2\} - 1$.

Once the coefficients have been derived, it is a simple matter to calculate the surface departure from a sphere, and to calculate the rms surface departure, the peak-to-valley difference, and any other measure desired. The size of the reference sphere against which the surface is compared, it should be noted, has a radius equal to the distance between the "Surface" location (position at which the focus of the Objective lens coincides with the surface of the Part Under Test) and the present location of the focus of the objective (in general, there will be no result unless this location is either near the "Surface" location itself, or is near the Center of Curvature of the part).

The departure from sphericity of the surface can be expressed in the form of Zernike polynomials (which are simply appropriately weighted combinations of surface polynomials), which are commonly used descriptors of optical elements, useful in the study of aberrations.

The radius of curvature of a spherical surface can be measured in several ways. The simplest and most direct is to measure the distance between the two "crossing points" of the second order coefficients. This distance is equal to the radius of curvature of the spherical surface. Provided the part is aligned so that the optical axis runs through the center of the spherical surface, the plots of $a_{02}$ and $a_{20}$ as a function of position z will be identical, falling to zero at the same positions near the "Surface" and the "Center of Curvature" (CoC) locations. This is a very direct and robust measurement, since it will yield the radius of curvature even if the instrument is not properly calibrated. That is, the relationship between the spot shifts $\Delta x_{ij}$ and $\Delta y_{ij}$ and the deviation of the surface from a true sphere might not be correctly calculated because the distances or focal lengths might not be properly entered, but (as long as the focus scale of z measurement is properly calibrated) the separation between the crossing points will give the radius of curvature in all cases. In fact, this method can be used to check the calibration of the translation stage.

The radius can also be obtained from the variation of the coefficients $a_{20}$ and $a_{02}$ with position, z. Again, assuming that both curves coincide (so that we may speak of them as the single function, $a_2(z)$), and assuming z is measured from the Surface position, the relationship between $a_2$ (z) and z will be given by:

$$\frac{1}{r} = \frac{1}{z} + (a_{20} + a_{02}) = \frac{1}{z} + 2a_2$$

Which can be re-arranged to give $$a_2 = \frac{1}{2r} - \frac{1}{2z}$$

A plot of $a_2$ versus position can yield the radius in one of two ways. If $a_2$ is plotted against z, then one can derive the radius from the slope:

$$r = \sqrt{\frac{1}{2\left[\frac{\partial a_2}{\partial z}\right]_{z=r}}}$$

A plot of $a_2$ vs. 1/z gives the result more directly, since the intercept, by the above equation, is 1/2r. Both of these methods can be used to calibrate the instrument, if the measurement is performed with a known spherical standard. (The radius of the part need not even be known, since the coefficient of 1/z must be −1/2. All one needs to know is that the part is spherical.)

Finally, if the part is known to be spherical, but the plots of $a_{20}$ and $a_{02}$ do not overlap, then this separation can be used to calculate the decentering of the part (i.e.—the separation between the center as defined by the fixture for the part and the optical axis of the measuring head). One can express the coefficients $a_{20}$, $a_{02}$, and $a_{11}$ as a function of the center location $(x_0, y_0)$, or vice-versa:

$$a_{20} = \frac{1}{2}\left[\frac{1}{r_1} - \frac{1}{r_0} + \frac{3}{2}\frac{x_0^2 + y_0^2}{r_1^3}\right]$$

$$a_{02} = \frac{1}{2}\left[\frac{1}{r_1} - \frac{1}{r_0} + \frac{1}{2}\frac{x_0^2 + y_0^2}{r_1^3}\right]$$

$$a_{11} = \frac{x_0 y_0}{r_1^3}$$

$$x_0 = r_1^{3/2}\sqrt{\sqrt{(a_{20} - a_{02})^2 - a_{11}^2} + (a_{20} - a_{02})}$$

$$y_0 = \frac{a_{11} r_1^{3/2}}{\sqrt{\sqrt{(a_{20} - a_{02})^2 - a_{11}^2} + (a_{20} - a_{02})}}$$

When the surface has a well-defined geometrical form which is nearly spherical, the coefficients can be analyzed to yield information about that shape. A good example is a toric surface, in which the surface resembles a slice from the outer edge of a torus. Such a surface has one radius of curvature along one axis and a different radius of curvature along the axis perpendicular to the first. A toric shape is commonly used in contact lenses to correct for astigmatism. A sphere is a special case of a toric in which the two radii of curvature are equal.

The general equation for a toric can be given in the form:

$$x^2+y^2+z^2+R^2-r^2-2R\sqrt{x^2+y^2}=0$$

These variables x, y, and z are different from those used in the rest of this paper, and should not be confused with them. This equation describes a circle of radius r which is rotated about and axis in the plane of the circle, lying a distance R from the center of the circle. The familiar "doughnut" shape is generated when R>r. In this case the large circle of radius R lies in the xy plane, and the axis z runs through the center of the doughnut "hole". The toric surface used in lenses lies near the outer extremity of such a doughnut shape, near the point a distance R+r from the center along the x or y axis. A segment near this point lying in the xy plane will have a radius of curvature of r+R. A segment lying perpendicular to this plane, in the xz plane, for instance, with have radius of curvature r. In practice, R is usually significantly smaller than r, so the "doughnut" is re-entrant, and very nearly resembles a sphere. The axis along which the radius is equal to R+r, called the Cylindrical axis (as R+r is called the Cylindrical Radius of Curvature) may lie rotated by some angle $\phi$ from the Zero axis of reference of the SMI. The axis along which the radius measures r (the Spherical Radius of Curvature, measured along the Spherical axis) is always perpendicular to the Cylindrical axis.

For such a part plots of the coefficients $a_{02}$, $a_{20}$, and $a_{11}$ as a function of position z look somewhat different than in the spherical case. $a_{11}$ is still constant, but is not equal to zero. The coefficients $a_{02}$ and $a_{20}$ will look similar to each other, maintaining a fixed separation, but will not coincide. The values of these three coefficients, along with a knowledge of the distance from the Surface location at which the coefficients are determined, will give the values of r, R, and $\phi$. (The plots of $a_{02}$ and $a_{20}$ will still coincide at the Surface location, so there is no ambiguity). The relevant equations are:

$$r = \left[\frac{1}{z} + (a_{20}-a_{02}) + \sqrt{(a_{20}-a_{02})^2 + (a_{11})^2}\right]^{-1}$$

$$R = \frac{2r^2\sqrt{(a_{20}-a_{02})^2 + (a_{11})^2}}{1-2r\sqrt{(a_{20}-a_{02})^2 + (a_{11})^2}}$$

$$\phi = \frac{1}{2}\tan^{-1}\left(\frac{a_{11}}{a_{20}-a_{02}}\right)$$

In order to use these equations one need only know the values of the coefficients at a single location (whose position relative to the Surface must also be known). It is useful to obtain measurements at several positions, however, since then one can calculate the functional form via a least-square method and thus compensate for random errors in measurement. We find by experience that such random errors can be significant, so looking at the trend allows us to obtain a more accurate result than we can though measurement at any one position. This is also an advantage of this method of performing Shack-Hartmann tests over static methods.

The value of the Shape Factor of an aspheric part can also be obtained by using the values of the coefficients. The Shape Factor is given by $\kappa+1$, where $\kappa$ is the "Conic Constant". The value of $\kappa+1$ equals 1 for a sphere. If the value is greater than 1 or between 1 and 0 the result is an ellipse. A value of $\kappa+1=0$ gives a parabola, while a value less than zero yields a hyperbola.

Provided the axis of the part is aligned with the axis of the optical system and centered, the Shape Factor $\kappa+1$ is given by the fourth order coefficients $a_{40}=a_{04}=a_{22}/2=a_4$ by the expression:

$$\kappa+1=8r^3a_4+1$$

Here r is, of course, the value of the radius of curvature obtained from crossing-point data, or one of the other methods noted above.

For practical measurements, it may sometime be necessary to make small corrections to these mathematically derived formulas.

Figure 10:
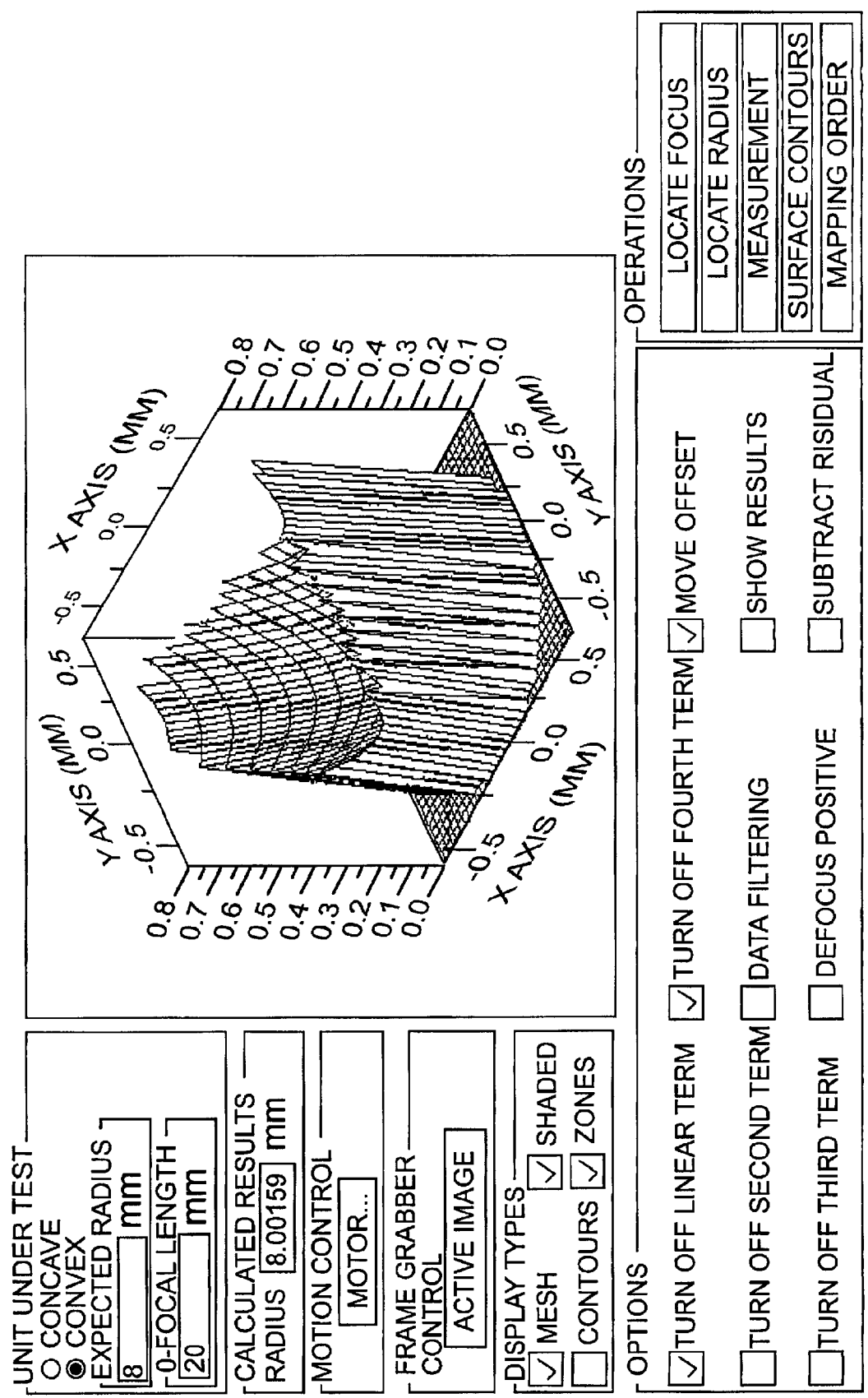
FIG. 10 is a screen from a program used in conjunction with the apparatus of the invention to provide a graphical user interface by which properties of a test surface can be displayed, various system instructions issued, and other test unit properties described.
Figure 11A:
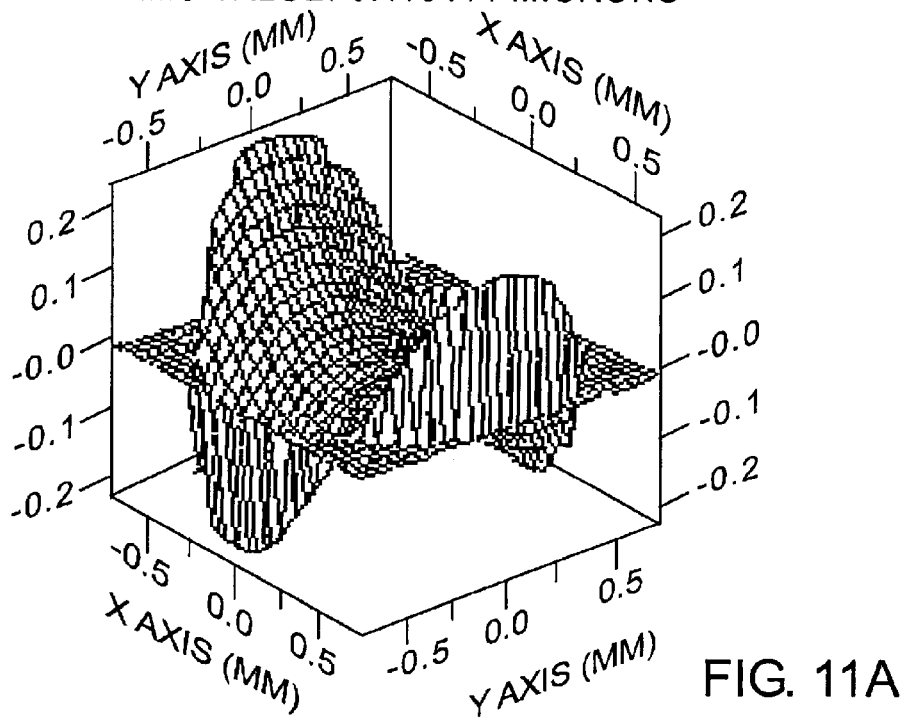
FIG. 11 is an output screen from a computer program used in conjunction with the apparatus to graphically display topographic maps of the surface of a test unit for various states of defocus.
Figure 11B:
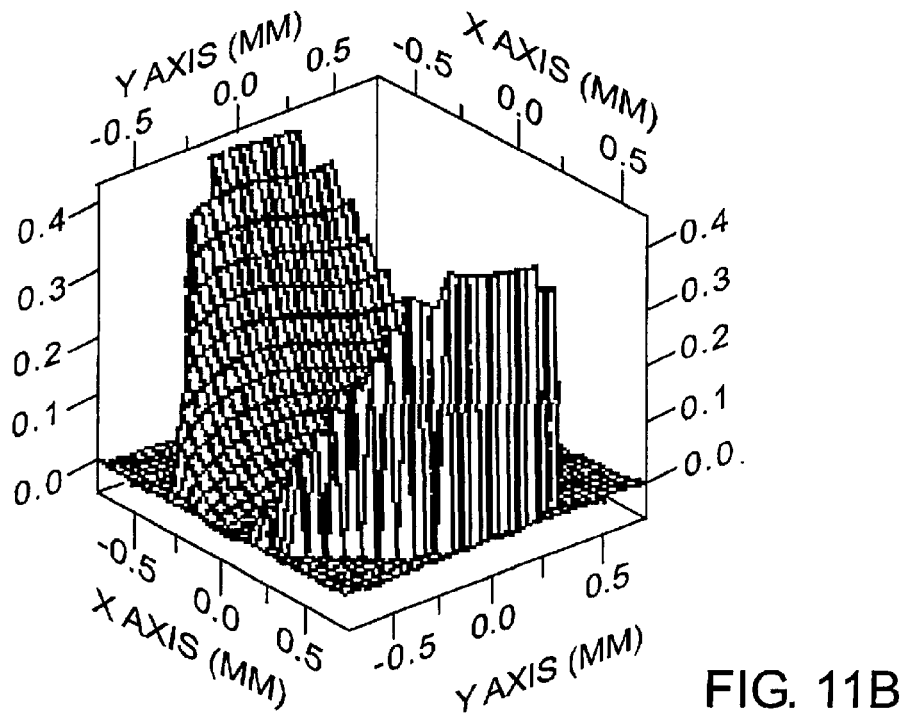
Figure 11C:
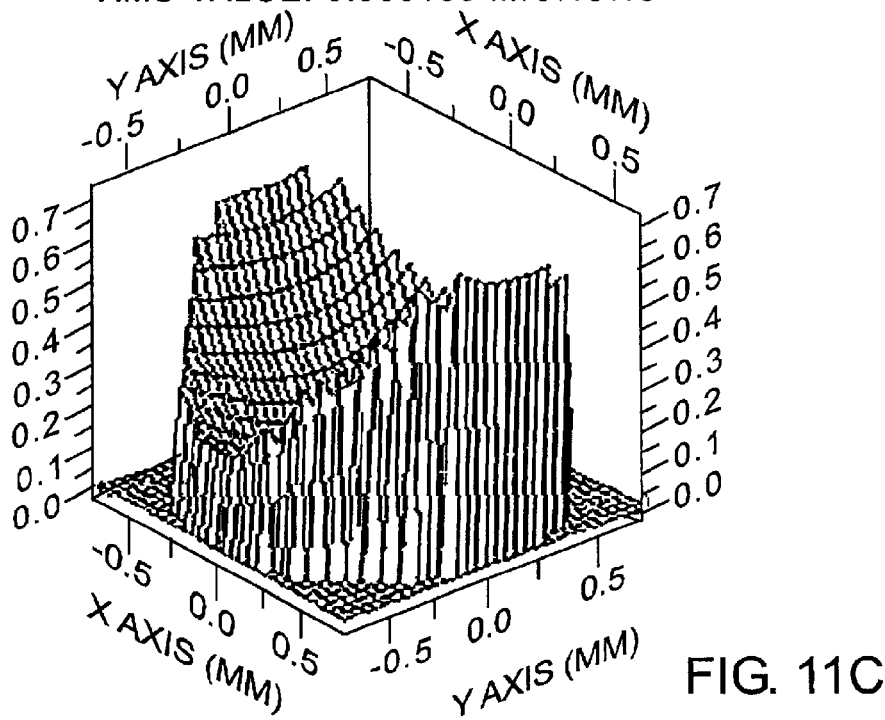
Figure 11D:
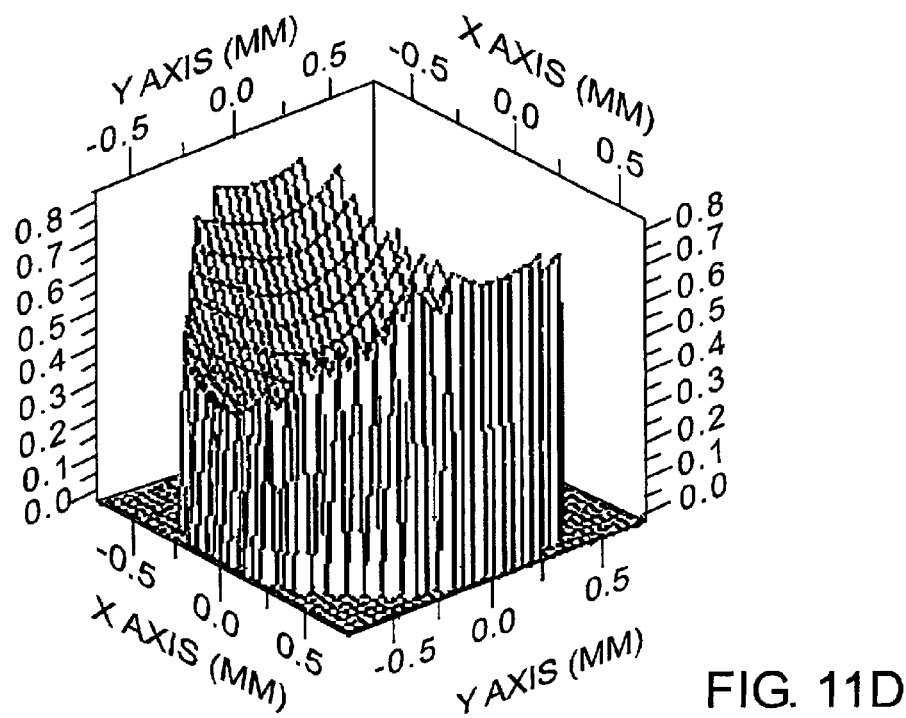
Figure 12A:
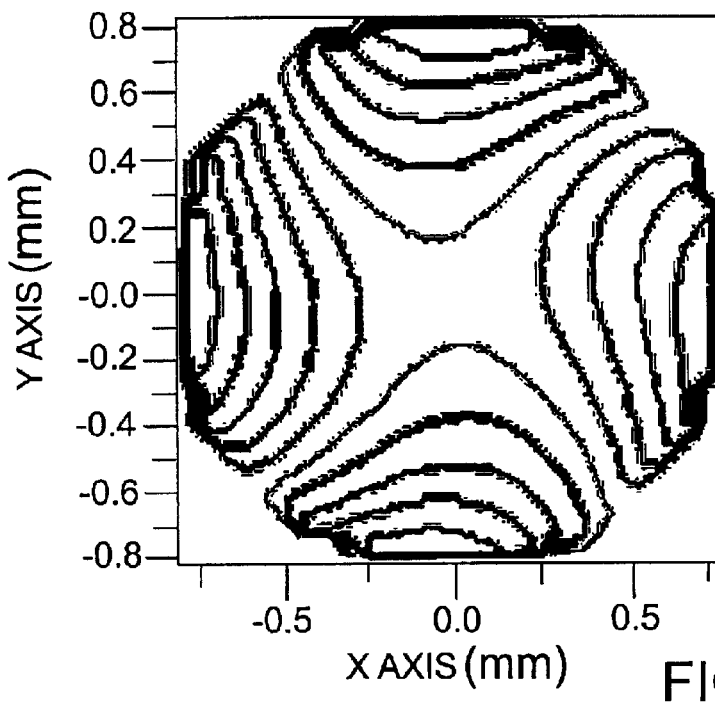
FIG. 12 is an output screen from a computer program used in conjunction with the apparatus of the invention showing various surface contour plots for different states of defocus of a test unit.
Figure 12B:
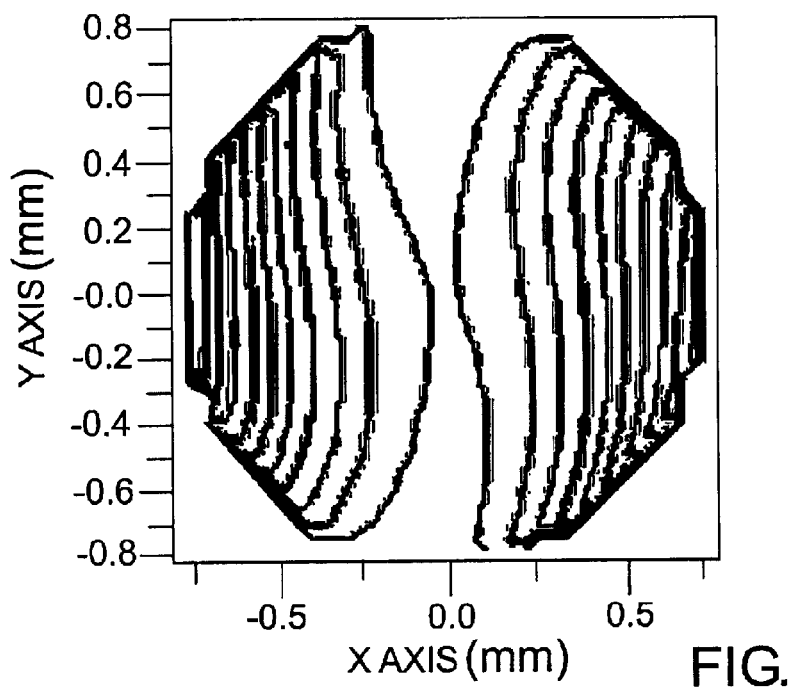
Figure 12C:
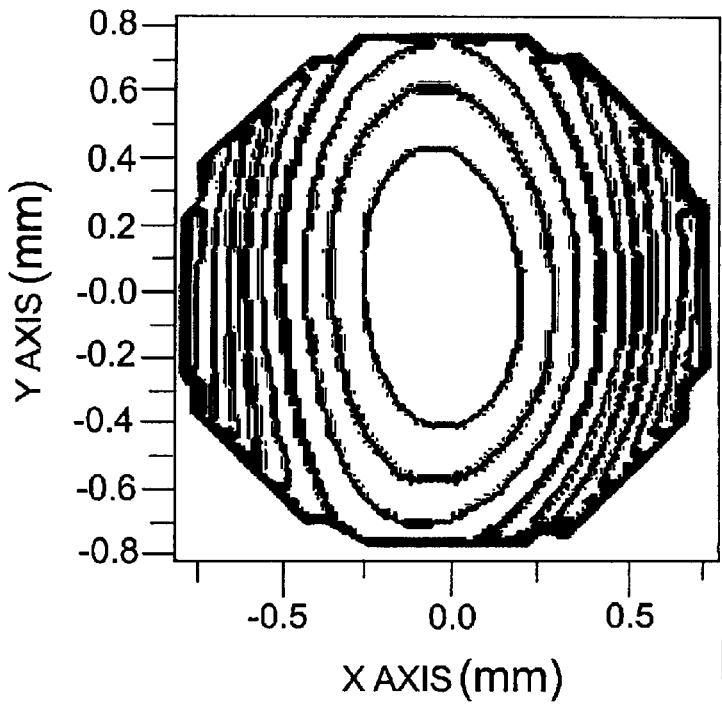
Figure 12D:
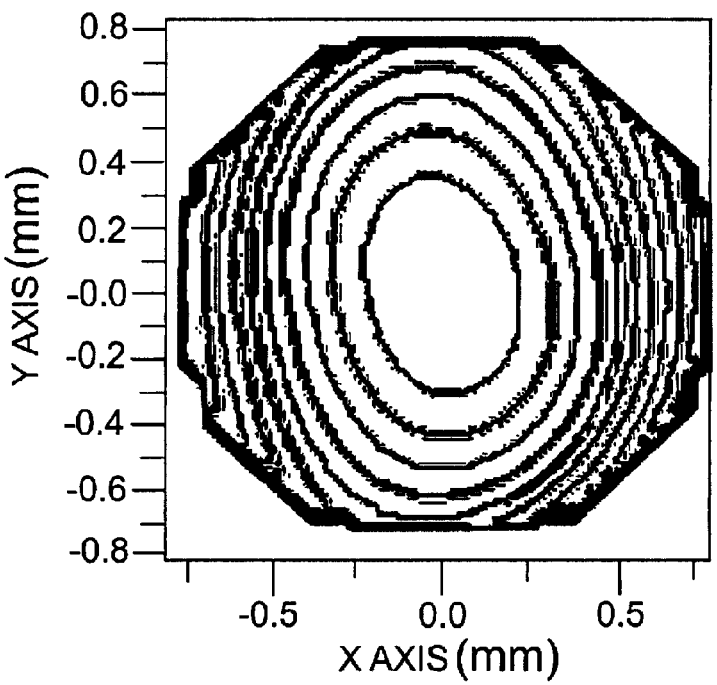
Figure 13:
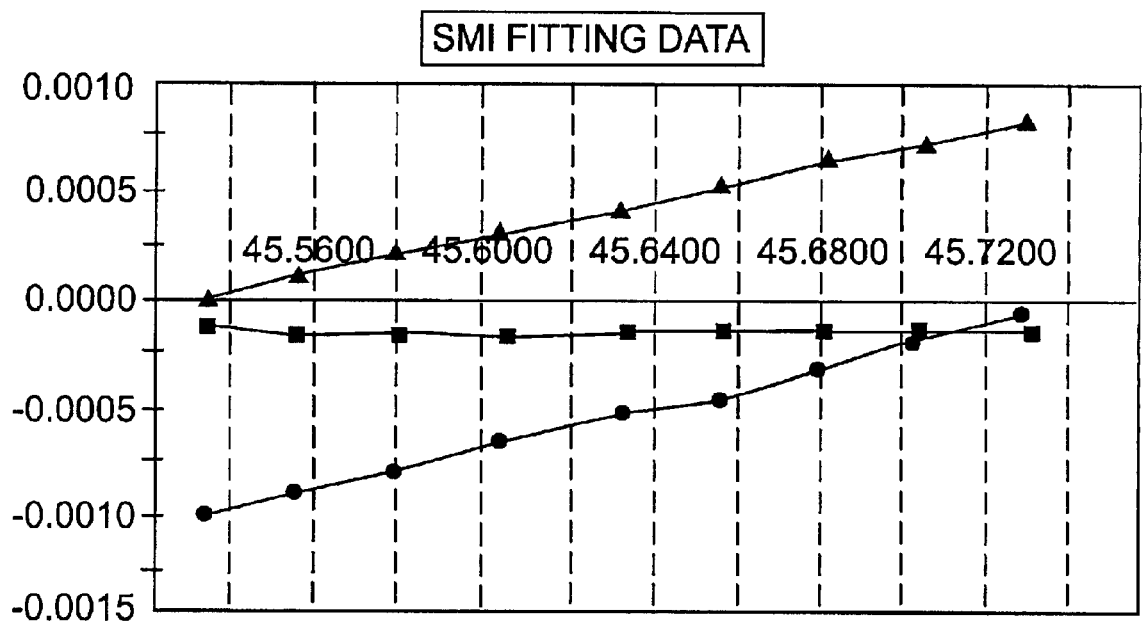
FIGS. 13 and 14 are output screens illustrating various coefficient plots as a function of the position of a wavefront origin with respect to a test surface for a toric surface and spherical surface, respectively.
Figure 14:
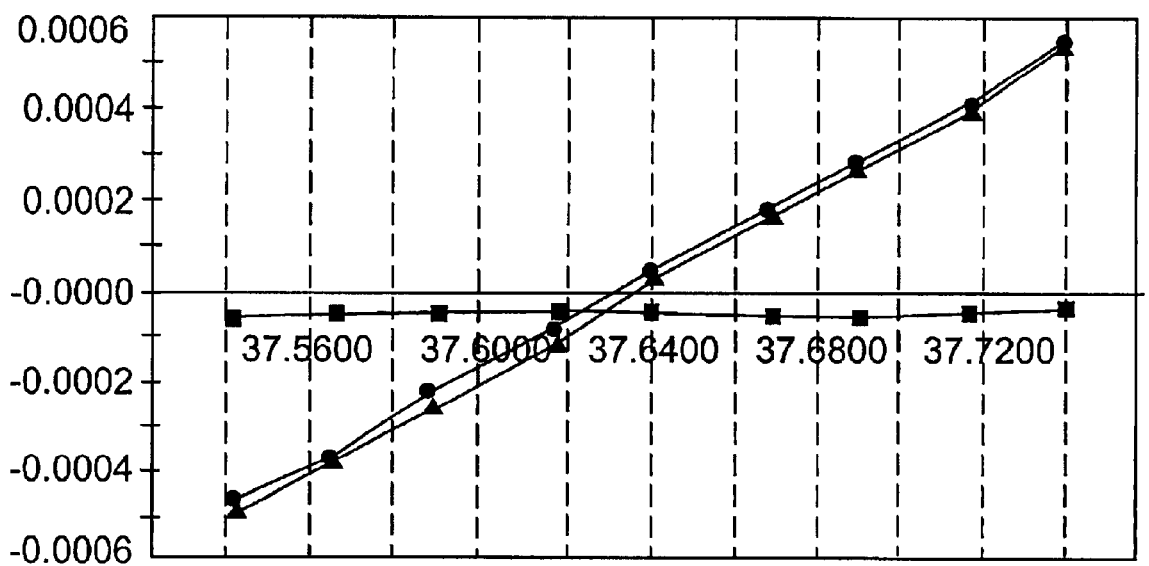

The foregoing algorithms for extracting surface and other information from the measured deviated spot locations can be readily programmed in a variety of program languages along with providing the graphical, tabular, and other data values. FIG. 10 shows, for example, one screen interface that shows a three-dimensional surfaced map along with various dialog boxes that provide the user with the ability to select options, operations, part description, and display types.

FIGS. 11 and 12 show contour and three-dimensional maps of a surface as a function of defocus position, and FIG. 15 shows one possible format for displaying toric and/or spherical information.

One possible general flow chart consistent with the inventive method is given by the following:

Input the type of measurement desired:
  a.) Generate Surface Profile only
  b.) Measure Radius of Curvature of Spherical Part
  c.) Measure Spherical Radius of Curvature, Cylindrical Radius of Curvature, and Angle for Toric Part
  d.) Measure Shape Factor or Conic Constant of Aspheric Part
  e.) Measure Aspheric Coefficients for Aspheric Part
  f.) Other
  1.) Input Target Radius, if known, or indicate that Radius is unknown. Input other data (toric angle, etc.) if relevant.
  2.) Perform measurement of spot deviation in the vicinity of the Surface location (i.e., with the translation stage positioned so that the focal point of the objective lies near the surface of the part under test. Locate the position at which the spot locations differ from the reference positions by at most a linear shift. Designate this the "zero" position for the stage, and refer all other positions to this one. If no "surface" location can be found produce an "error" message. This indicates that the surface finish of the part is too poor for measurement, or that the surface at the center is tilted too far from normal to the optical axis, or that no part is present.
  3.) Go to the vicinity about one radius of curvature from this location. If the radius is not known, search for the location at which one again finds a disposition of spots similar to that found at the reference location or at the Surface position. If no such position can be found, report this in an "error" message. It indicates that the radius of curvature of the part exceeds the range of the machine, or else the finish of the part is too poor to allow measurement or there is no part or there is extreme misalignment.
  4.) Perform at least one measurement but preferably a series of measurements at the "Center of Curvature" (CoC) location, similar to that performed near the "Surface" location. Measurements are preferably performed at several locations in the vicinity of the CoC.

At each position the shifts in the spot locations are measured. From these shifts and the known distance z from the surface (and the known parameters of the SMI device) the coefficients $a_{10}$, $a_{01}$, etc. of the polynomial describing the deviation of the surface from a reference sphere of radius z are determined.

5.) Surface maps of the surface deviation at selected positions are generated and displayed.

6.) If a specific Measurement has been requested the software uses the relevant formulae to calculate the needed quantities from the positions z and the coefficients $a_{um}(z)$. For spherical parts the Radius of Curvature can be calculated. For Toric parts the two Radii of Curvature and the angles the axes of the radii make with the reference axis of the SMI are calculated. For Conic Section parts the Conic Constant or Shape Factor is calculated (as well as the base Radius of Curvature). Other measurements may be added to this list. Least square algorithms can be applied to fit predetermined analytical functions, spheres, aspheres, torics, or the like, to the measured surface or wavefront shape.

Those skilled in the art will be able to imagine other variants based on the teaching of the disclosure. Some of those variants are shown in FIGS. 16 through 21.

Figure 16:
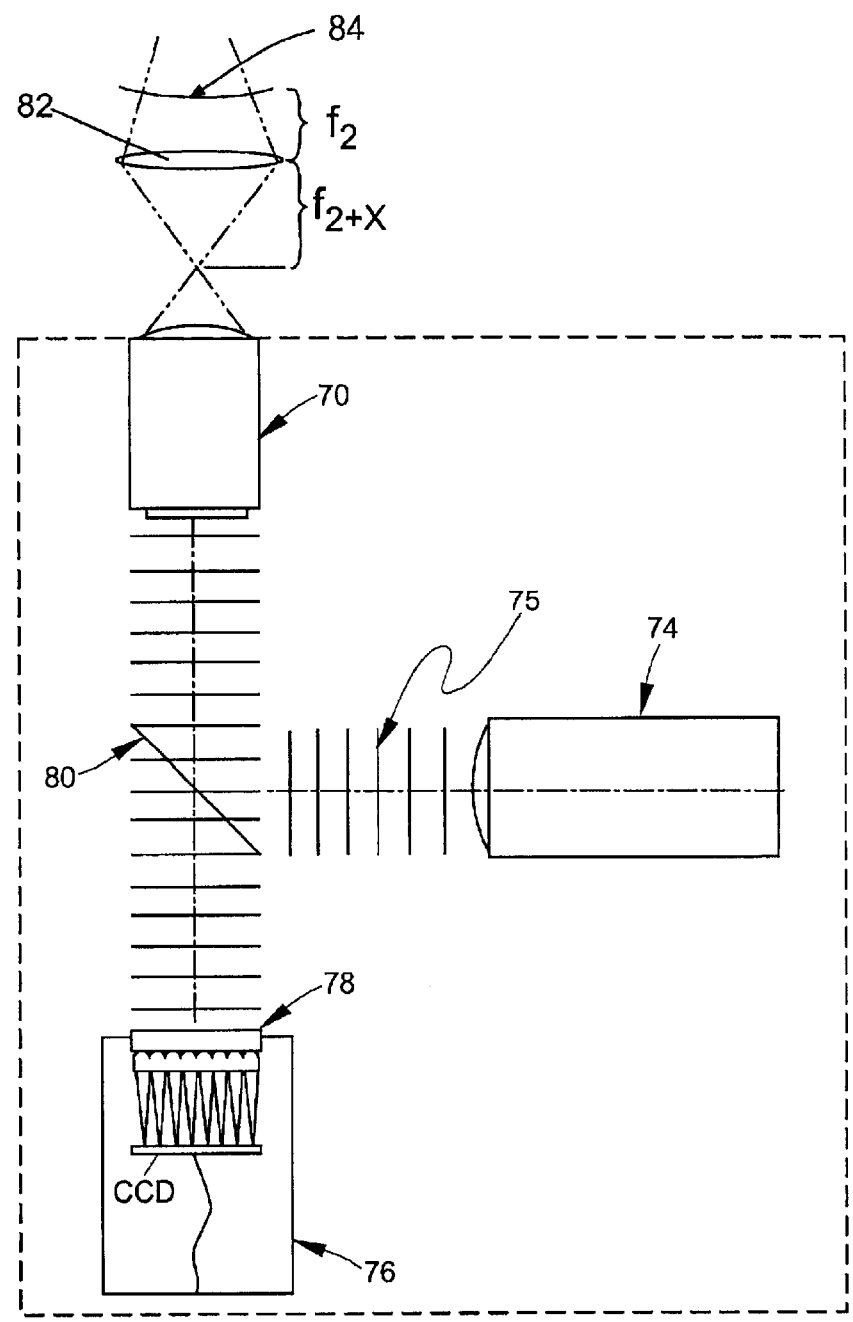
FIG. 16 is a diagrammatic elevational view similar to FIG. 5 with the addition of a lens forward of the microscope objective to enable measurement of long radius parts.

FIG. 16 is a diagrammatic elevational view similar to FIG. 5 with the addition of an additional of a stationary positive lens 82 located forward of the microscope objective 70 to enable measurement of long radius parts where parts from FIG. 5 that reappear here in FIG. 16 bear the same numerical identification they had in FIG. 5. If lens 82 has a focal length, $f_2$, then the radius of a part as indicated at 84 is given by:

$$R = f_2^2 / x$$

where x is the displacement of the microscope objective 70 required for collimation off of the reflective part 84. If x is positive, then R is convex, and if x is negative, then R is concave.

Figure 17:
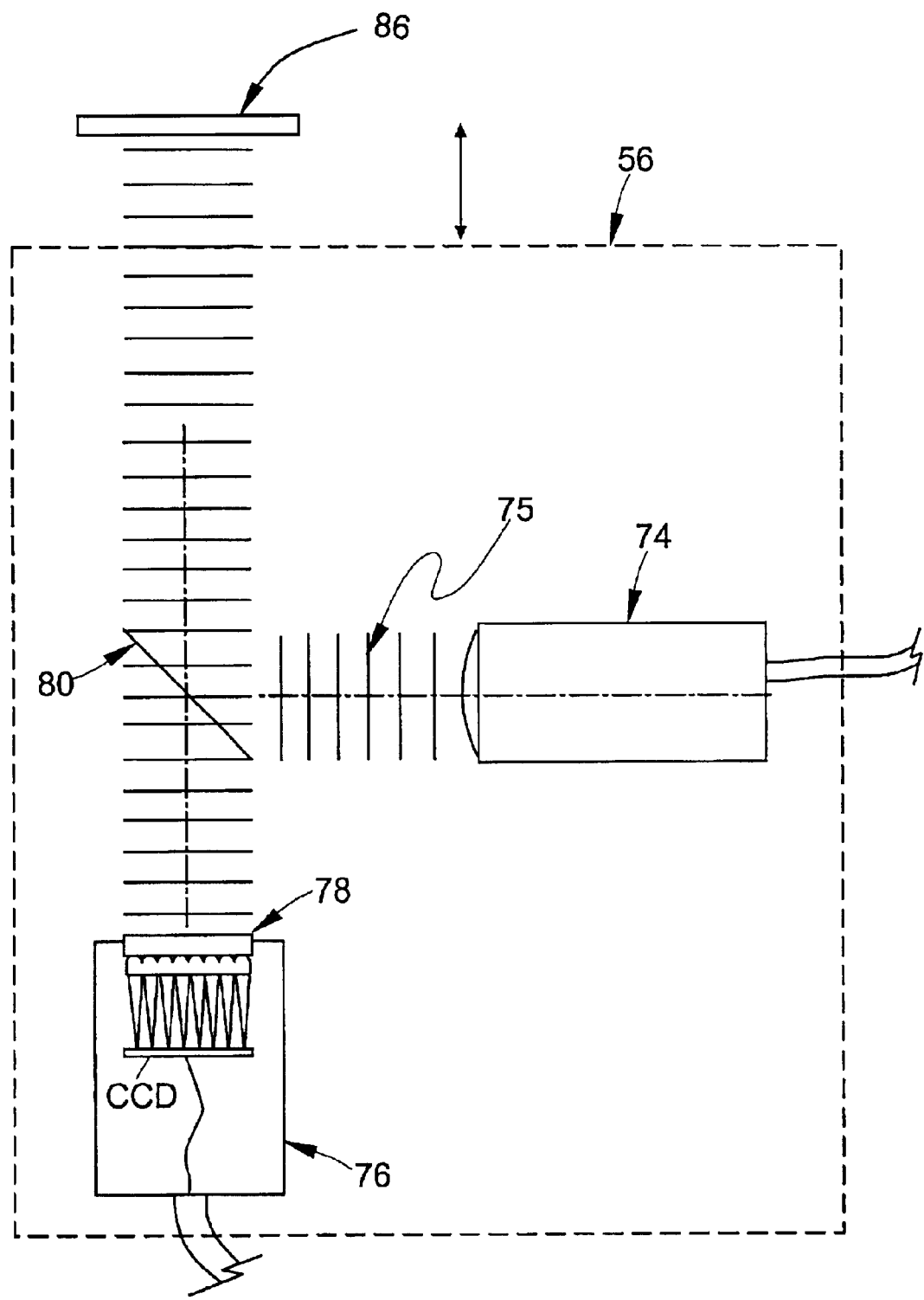
FIG. 17 is a diagrammatic elevational view similar to FIG. 5 except for the absence of the objective which has been removed to enable measurement of flat surfaces that are at least partially reflective.

Reference is now made to FIG. 17 which shows a diagrammatic elevational view of an embodiment of the invention that is similar to FIG. 5 except for the absence of the objective which has been removed to enable measurement of flat surfaces that are at least partially reflective. With the objective removed, a flat object such as that designated at 86 can be tested for the flatness of its partially reflective surface by causing it to be illuminated with a plane wavefront 75 that now becomes the reference against which any wavefront distortion caused by the test surface may be compared as before. Again, repeated parts are identified here with their previous number.

Figure 18:
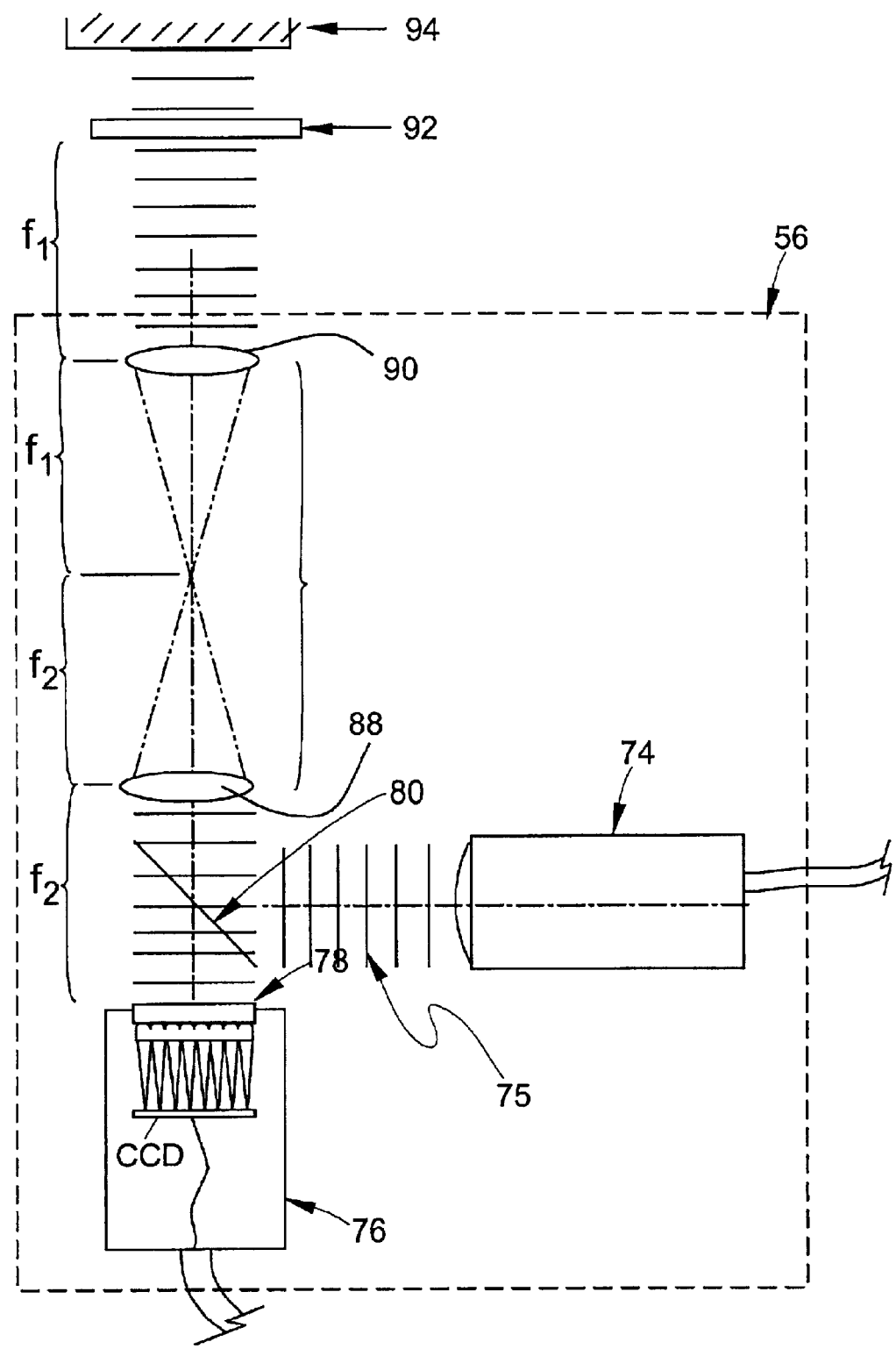
FIG. 18 is a diagrammatic elevational view similar to FIG. 17 except for the presence of an additional mirror and a relay system for measuring the wavefront error of transmissive filters over their bandpass.

FIG. 18 is a diagrammatic elevational view similar to FIG. 17 except for the presence of an additional mirror and a relay system for measuring the wavefront error of transmissive filters over their bandpass. As can be seen here, a relay system comprising lenses 88 and 90 are placed in the intervening space between beamsplitter 80 and a bandpass filter 92. Plane reference wavefront 75 passes through bandpass filter 92 after which it impinges on flat mirror 94 from which it is reflects to travel back through bandpass filter 92, now having made a double pass through it, enters the relay system, and emerges as a more or less distorted wavefront which enters the camera 76. Because the filter transmits only the light within its bandpass, this embodiment measures the wavefront error of the filter only within that bandpass. Thus, the use of a broadband source instead of a spectrally narrow source has the advantage of being able to test filters whose bandpasses can span a broad spectral range.

Figure 19:
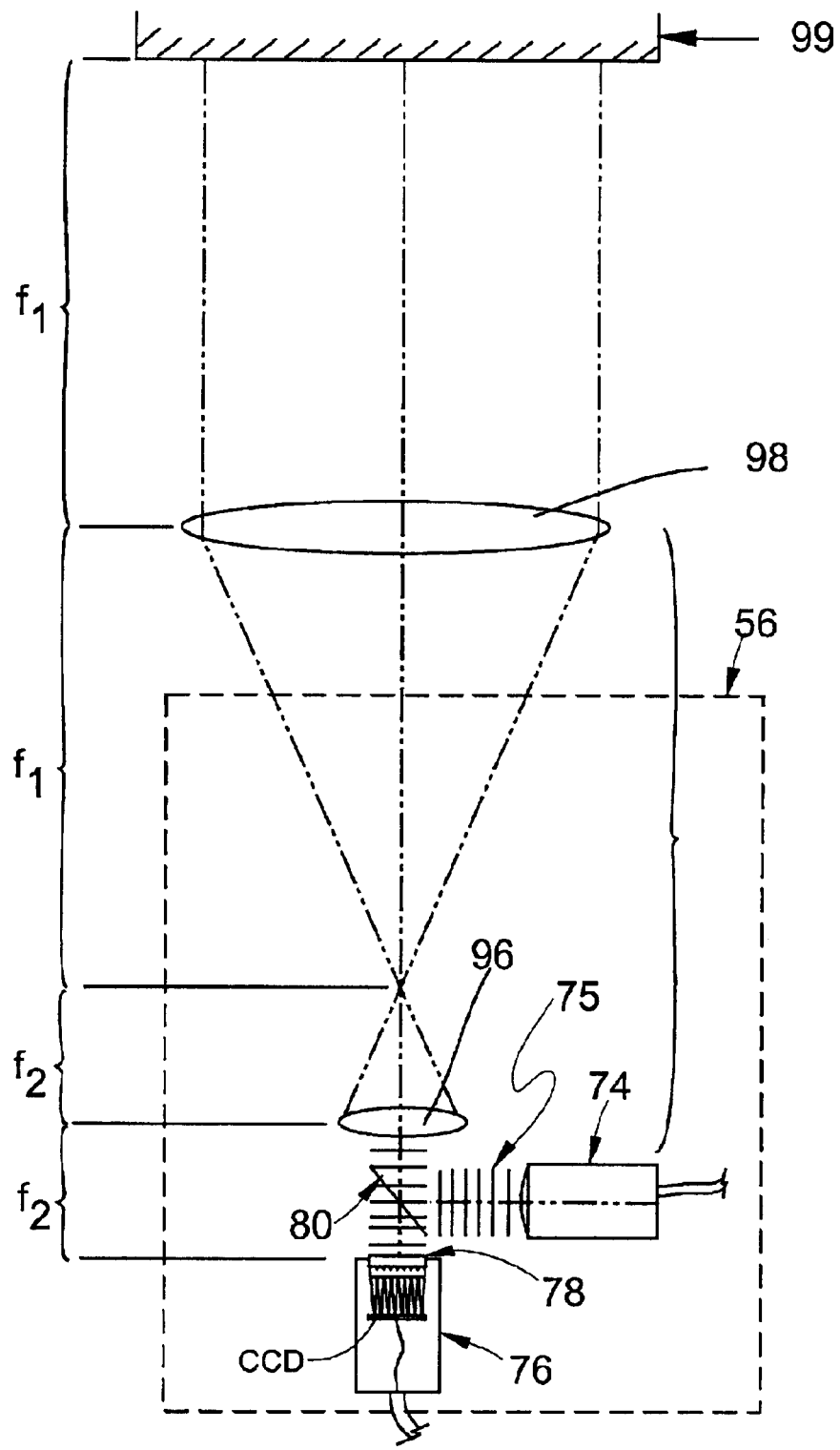
FIG. 19 is a diagrammatic elevational view similar to FIG. 17 with the addition of a beam expansion section to measure large flat surfaces.

FIG. 19 is a diagrammatic elevational view of an embodiment of the invention similar to that shown in FIG. 17 with the addition of a beam expansion section to measure large flat surfaces. The beam expansion section comprises two positive lenses 96 and 98 that operate in conjunction with one another to enlarge the diameter of the plane reference wavefront so that it can cover a larger area of a reflective part to be measured as, for example, the flat designated at 99. Alternative telescope geometries can also be used.

Figure 20:
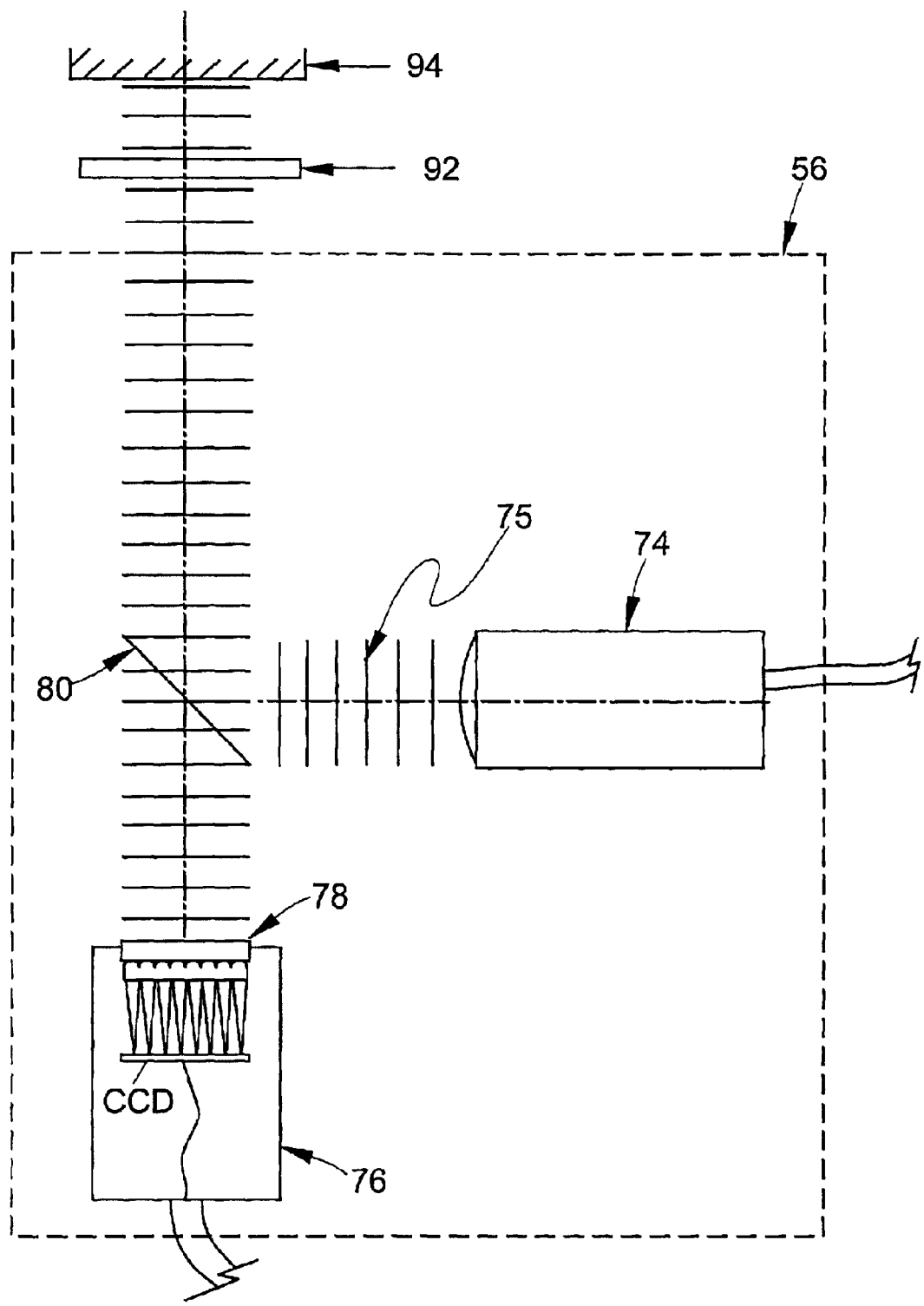
FIG. 20 is a diagrammatic elevational view similar to FIG. 18 except for the absence of the relay system and measures the wavefront error of transmissive filters over their bandpass.

FIG. 20 is a diagrammatic elevational view of an embodiment of the invention similar to that of FIG. 18 except for the absence of a relay section and, like the embodiment of FIG. 18 measures the wavefront error of transmissive filters over their bandpass. This embodiment is suitable for use where a relay section is not needed to image the part under test on to the lenslet array.

Figure 21:
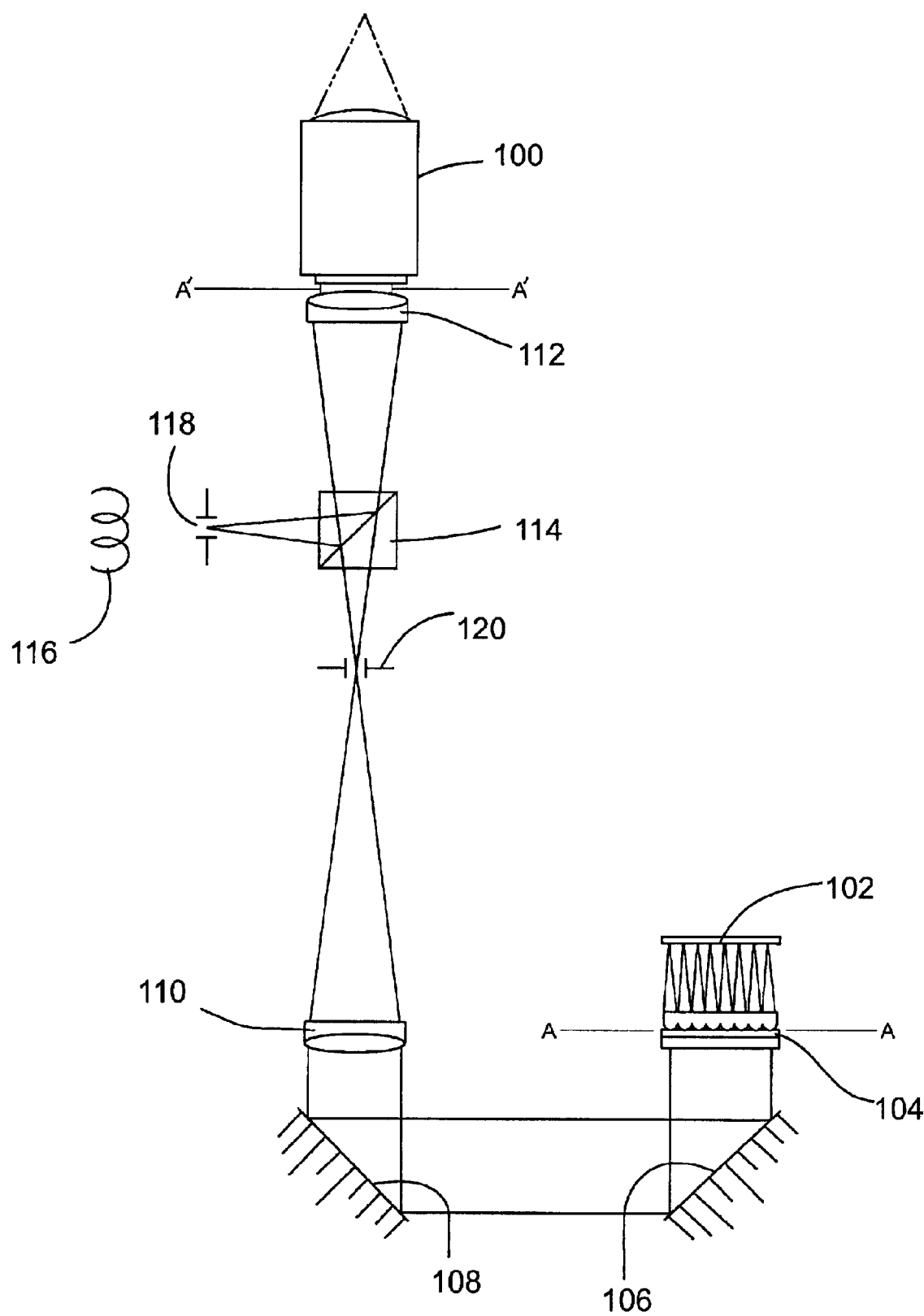
FIG. 21 is a diagrammatic elevational view of an alternative embodiment of the invention that uses an intervening telescope between the objective and CCD array to make full use of the available numerical aperture (NA) of the objective.

Reference is now made to FIG. 21 which is a diagrammatic elevational view of an alternative embodiment of the invention that uses an intervening telescope between the objective and CCD array to make full use of the available numerical aperture (NA) of the objective. Here, there is an objective 100, a CCD array 102, and crossed lenticular lens 104, all of which operate as before. The optical path between objective 100 and CCD 102 includes an intervening telescope comprising lenses 110 and 112 and a pair of mirrors 106 and 108 for folding it for vertical compactness. The purpose of the telescopic lenses 110 and 112 is to optically scale the size of the CCD and lenticular array so that they fill the pupil of objective 100 to make full use of its numerical aperture (NA). As a convenience, a light source 116 is introduced in the telescope via beamsplitter 114 that is conjugate to a spatial filter 120 that operates to eliminate stray light.

Thus, it will be appreciated that spot sizes, CCD resolution, pixel saturation levels, objective NA and magnification, and pinhole size are among design parameters that may be varied. In addition, it will be appreciated that scaling optics may be placed between the microscope objective and the lenticular screen or the image plane of the lenticular array and the CCD to reimage the array of spots onto the CCD to rescale the relative sizes of the spots with respect to the pixels. Trigonometric polynomials or other series approximations for surface shape may be used. It will also be appreciated that the thickness and power of an element may be derived by examining both front and rear surfaces. In addition, the use of a strobe light or pulsed source may be used in place of a continuous source to study the dynamic properties of surfaces and transmitting components and the apparatus and test samples may be moved relative to one another to scan the properties of the surface in, for example, a web or scanning process. It will also be clear that the two-dimensional CCD array may be replaced by a one-dimensional array that scans across the focal plane of the crossed lenticular screen array or its equivalent. Accordingly, it is intended that these and other modifications and variations be within the scope of the invention.

What is claimed is:

1. Apparatus for automatically measuring the surface properties of optical elements, said apparatus comprising:

a support for an element having at least one test surface to be measured;

means for generating an output beam having a predetermined wavefront profile;

a measurement plane;

means for controllably translating said output beam along an optic axis with respect to said support so that said predetermined wavefront profile thereof impinges on said element from a predetermined direction and then is reflected to travel opposite said predetermined direction as a distorted wavefront containing distortions that vary in accordance with the topography of said test surface and the position of said output beam along said optic axis; and means for sampling said distorted wavefront at predetermined locations thereover, each of which said predetermined locations corresponds to a discrete portion of said distorted wavefront, as said output beam is translated relative to said test surface, focusing each of said discrete portions to a spot in said measurement plane, determining the two-dimensional deviation of said spots away from their anticipated focal point in said measurement plane, and determining the local deformation of said distorted wavefront based on said deviations everywhere corresponding to a sampled location on said test surface and the position of said output beam with respect to said test surface along said optic axis.

2. The apparatus of claim 1 further including analytical means for representing the topography of said test surface with a mathematical approximation comprising a series of coefficients and variables; calculating the value of said coefficients based on the local deformation of said wavefront at at least one position of said source with respect to said test surface.

3. The apparatus of claim 2 wherein said analytical means includes means for performing an optimization analysis using the values of said coefficients calculated for each position of said source and test surface to arrive at a final value for said coefficients that are used for said mathematical approximation to represent the shape of said surface to a predetermined accuracy.

4. The apparatus of claim 1 wherein said predetermined wavefront comprises a plane wavefront.

5. The apparatus of claim 1 wherein said predetermined wavefront comprises a nominally spherical wavefront.

6. The apparatus of claim 1 wherein said means for generating said output beam comprises a light source and collimating optics.

7. The apparatus of claim 6 further including a well-corrected objective lens.

8. The apparatus of claim 1 further including a positive lens located in a fixed position with respect to said support and along said predetermined direction to facilitate the measurement of parts having long radii of curvature.

9. The apparatus of claim 4 further including a reflective means positioned with respect to said support to facilitate the measurement of transmitted wavefront errors in optical bandpass components including filters and windows.

10. The apparatus of claim 9 further including a relay section.

11. The apparatus of claim 4 further including a beam expansion section.

12. The apparatus of claim 1 wherein said means for sampling said distorted wavefront comprises a two-dimensional lens array and a two-dimensional photodetector array having discrete sensing elements.

13. The apparatus of claim 12 wherein said two-dimensional lens array comprises a pair of crossed lenticular screens with index mismatching material between them.

14. The apparatus of claim 12 wherein said means for generating said output beam comprises a microscope objective lens and further including a telescopic section between said microscope objective lens and said two-dimensional lens array to image said two-dimensional photodetector array into the pupil of said microscope objective lens.

15. Apparatus for automatically measuring the properties of surfaces that are at least partially specularly reflective, said apparatus comprising:

a support for an element having at least one test surface to be measured;

a source having an output with a predetermined wavefront profile;

a measurement plane;

means for controllably moving said source and said support relative to one another along an optic axis so that a test surface in said support continuously reflects said output from said source back towards said source while distorting said wavefront profile thereof in accordance with the topography of said test surface and the relative position of said source with respect to said test surface along said optic axis; and means for sampling said distorted wavefront profile at predetermined locations thereover, each of which said predetermined locations corresponds to a discrete portion of said distorted wavefront profile, as said source is moved relative to said test surface along said optic axis; focusing each of said discrete portions to a spot in said measurement plane, determining the two-dimensional deviation of said spots away from their anticipated focal point in said measurement plane, and determining the local deformation of said distorted wavefront profile based on said deviations everywhere corresponding to a sampled location on said test surface and the position of said source with respect to said test surface along said optic axis.

16. The apparatus of claim 15 further including analytical means for representing the topography of said test surface with a mathematical approximation comprising a series of coefficients and variables; calculating the value of said coefficients based on the local deformation of said wavefront at at least one position of said source with respect to said test surface.

17. The apparatus of claim 15 wherein said analytical means includes means for performing an optimization analysis using the values of said coefficients calculated for each position of said source and test surface to arrive at a final value for said coefficients that are used for said mathematical approximation to represent the shape of said surface to a predetermined accuracy.

18. The apparatus of claim 1 wherein said means for sampling said distorted wavefront profile comprises a two-dimensional lenslet array having a focal plane and a one-dimensional photodetector array arranged to scan across said focal plane.

19. The apparatus of claim 1 wherein said means for generating an output beam comprises one of a pulsed light source or strobe.

20. A method for automatically measuring the surface properties of optical elements, said method comprising the steps of:

supporting an element having at least one test surface to be measured;

generating an output beam having a predetermined wavefront profile;

providing a measurement plane;

controllably translating said output beam with respect to said support along an optic axis so that said predetermined wavefront profile thereof impinges on said element from a predetermined direction and then is reflected to travel opposite said predetermined direction as a distorted wavefront containing distortions that vary in accordance with the topography of said test surface and the position of said output beam along said optic axis; and sampling said distorted wavefront at predetermined locations thereover, each of which said predetermined locations corresponds to a discrete portion of said distorted wavefront, as said output beam is moved relative to said test surface along said optic axis, focusing each of said discrete portions to a spot in said measurement plane, determining the two-dimensional deviation of said spots away from their anticipated focal points in said measurement plane, and determining the local deformation of said distorted wavefront based on said deviations everywhere corresponding to a sampled location on the test surface and the position of said output beam with respect to said test surface along said optic axis.

21. The method of claim 20 further including the step of analytically representing the topography of said test surface with a mathematical approximation comprising a series of coefficients and variables and calculating the value of said coefficients based on the local deformation of said wavefront at at least one position of said source with respect to said test surface.

22. Apparatus for automatically measuring the surface properties of optical elements, said apparatus comprising:

a support for an element having at least one test surface to be measured;

means for generating an output beam having a predetermined plane wavefront profile;

a measurement plane;

means for controllably positioning said output beam with respect to said support so that said predetermined wavefront profile thereof impinges on said element from a predetermined direction and then is reflected to travel opposite said predetermined direction as a distorted wavefront containing distortions that vary in accordance with the topography of said test surface and the position of said output beam;

means for sampling said distorted wavefront at predetermined locations thereover, each of which said predetermined locations corresponds to a discrete portion of said distorted wavefront, as said output beam is moved relative to said test surface, focusing each of said discrete portions to a spot in said measurement plane, determining the two-dimensional deviation of said spots away from their anticipated focal points in said measurement plane, and determining the local deformation of said distorted wavefront based on said deviations everywhere corresponding to a sampled location and the position of said output beam with respect to said test surface; and reflective means positioned with respect to said support to facilitate the measurement of transmitted wavefront errors in optical bandpass components including filters and windows.

23. The apparatus of claim 22 further including a relay section.

24. Apparatus for automatically measuring the surface properties of optical elements, said apparatus comprising:

a support for an element having at least one test surface to be measured;

means for generating an output beam having a predetermined wavefront profile;

means for controllably positioning said output beam with respect to said support so that said predetermined wavefront profile thereof impinges on said element from a predetermined direction and then is reflected to travel opposite said predetermined direction as a distorted wavefront containing distortions that vary in accordance with the topography of said test surface and the position of said output beam; and a two-dimensional lens array comprising a pair of crossed lenticular screens with index mismatching material between them, and a two-dimensional photodetector array having discrete sensing elements for sampling said distorted wavefront profile at predetermined locations thereover as said output beam is moved relative to said test surface and determining the local deformation of said wavefront everywhere corresponding to a sampled location and the position of said output beam with respect to said test surface.

25. The apparatus of claim 24 wherein said means for generating said output beam comprises a microscope objective lens and further including a telescopic section between said microscope objective lens and said two-dimensional lens array to image said two-dimensional photodetector array into the pupil of said microscope objective lens.

26. Apparatus for automatically measuring the surface properties of optical elements, said apparatus comprising:

a support for an element having at least one test surface to be measured;

means for generating an output beam having a predetermined wavefront profile;

means for controllably positioning said output beam with respect to said support so that said predetermined wavefront profile thereof impinges on said element from a predetermined direction and then is reflected to travel opposite said predetermined direction as a distorted wavefront containing distortions that vary in accordance with the topography of said test surface and the position of said output beam; and means for sampling said distorted wavefront profile at predetermined locations thereover as said output beam is moved relative to said test surface and determining the local deformation of said wavefront everywhere corresponding to a sampled location and the position of said output beam with respect to said test surface, said means for sampling said distorted wavefront profile comprising a two-dimensional lenslet array having a focal plane and a one-dimensional photodetector array arranged to scan across said focal plane.

* * * * *